United States Patent
Jadon et al.

(10) Patent No.: US 11,823,079 B2
(45) Date of Patent: *Nov. 21, 2023

(54) MACHINE LEARNING PIPELINE FOR PREDICTIONS REGARDING A NETWORK

(71) Applicant: Juniper Networks, Inc., Sunnyvale, CA (US)

(72) Inventors: Shruti Jadon, San Jose, CA (US); Mithun Chakaravarrti Dharmaraj, Mountain View, CA (US); Anita Kar, Santa Clara, CA (US); Harshit Naresh Chitalia, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,895

(22) Filed: Oct. 7, 2022

(65) Prior Publication Data

US 2023/0031889 A1 Feb. 2, 2023

Related U.S. Application Data

(63) Continuation of application No. 16/920,113, filed on Jul. 2, 2020, now Pat. No. 11,501,190.

(51) Int. Cl.
*G06F 15/16* (2006.01)
*G06N 5/04* (2023.01)
*G06N 20/00* (2019.01)
*H04L 43/04* (2022.01)

(52) U.S. Cl.
CPC .............. *G06N 5/04* (2013.01); *G06N 20/00* (2019.01); *H04L 43/04* (2013.01)

(58) Field of Classification Search
CPC ........... G06N 5/04; G06N 20/00; H04L 43/04
USPC ........................................................ 709/200
See application file for complete search history.

(56) References Cited

U.S. PATENT DOCUMENTS

| | | | | |
|---|---|---|---|---|
| 9,565,119 | B2 * | 2/2017 | Ohkawa ................... | H04L 43/04 |
| 10,200,291 | B2 * | 2/2019 | Ohkawa ................... | H04L 69/16 |
| 10,469,329 | B1 | 11/2019 | Eicher et al. | |
| 10,686,872 | B2 * | 6/2020 | Pope ........................ | H04L 67/10 |
| 11,038,906 | B1 | 6/2021 | Bingham et al. | |
| 11,196,793 | B2 * | 12/2021 | Kim ......................... | H04L 69/16 |

(Continued)

OTHER PUBLICATIONS

Ding et al., "Model Selection Techniques—An Overview", arxiv. org, Cornell University Library, Oct. 23, 2018, 21 pp.

(Continued)

*Primary Examiner* — Moustafa M Meky
(74) *Attorney, Agent, or Firm* — Shumaker & Sieffert, P.A.

(57) ABSTRACT

This disclosure describes techniques that include using an automatically trained machine learning system to generate a prediction. In one example, this disclosure describes a method comprising: based on a request for the prediction: training each respective machine learning (ML) model in a plurality of ML models to generate a respective training-phase prediction in a plurality of training-phase predictions; automatically determining a selected ML model in the plurality of ML models based on evaluation metrics for the plurality of ML; and applying the selected ML model to generate the prediction based on data collected from a network that includes a plurality of network devices.

20 Claims, 9 Drawing Sheets

(56) References Cited

U.S. PATENT DOCUMENTS

| | | | |
|---|---|---|---|
| 11,295,214 B2 | 4/2022 | Pescarmona | |
| 11,354,804 B1 | 6/2022 | Behrooz et al. | |
| 11,394,768 B2 * | 7/2022 | Pope | G06F 9/5044 |
| 11,501,190 B2 * | 11/2022 | Jadon | G06N 3/086 |
| 2014/0361978 A1 | 12/2014 | Malarky et al. | |
| 2015/0043351 A1 * | 2/2015 | Ohkawa | H04L 47/28 |
| | | | 370/236 |
| 2017/0134295 A1 * | 5/2017 | Ohkawa | H04L 43/18 |
| 2018/0015370 A1 | 1/2018 | Sorek et al. | |
| 2019/0190982 A1 * | 6/2019 | Pope | H04L 45/38 |
| 2019/0354873 A1 | 11/2019 | Pescarmona | |
| 2019/0378210 A1 | 12/2019 | Merrill et al. | |
| 2020/0193288 A1 | 6/2020 | Li et al. | |
| 2020/0225655 A1 | 7/2020 | Cella et al. | |
| 2020/0274909 A1 * | 8/2020 | Kim | H04L 65/70 |
| 2020/0274921 A1 * | 8/2020 | Pope | H04L 63/1458 |
| 2020/0348662 A1 | 11/2020 | Cella et al. | |
| 2021/0157312 A1 | 5/2021 | Cella et al. | |
| 2021/0326715 A1 | 10/2021 | Pescarmona | |
| 2022/0400147 A1 * | 12/2022 | Pope | H04L 67/10 |

OTHER PUBLICATIONS

Extended Search Report from counterpart European Application No. 20198113.1 dated Apr. 1, 2022, 9 pp.

Prosecution History from U.S. Appl. No. 16/920, 113, dated Jul. 19, 2022 through Oct. 7, 2022, 19 pp.

Response to Extended Search Report dated Apr. 1, 2022, from counterpart European Application No. 20198113.1 filed Jul. 4, 2022, 20 pp.

\* cited by examiner

MACHINE LEARNING PIPELINE FOR PREDICTIONS REGARDING A NETWORK

This application is a continuation of U.S. patent application Ser. No. 16/920,113, filed Jul. 2, 2020, the entire content of which is incorporated by reference.

TECHNICAL FIELD

This disclosure relates to analysis of computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization within a large-scale data center can provide several advantages, including efficient use of computing resources and simplification of network configuration. Thus, enterprise IT staff often prefer virtualized compute clusters in data centers for their management advantages in addition to the efficiency and increased return on investment (ROI) that virtualization provides. However, virtualization can cause some challenges when analyzing, evaluating, and/or troubleshooting the operation of the network.

SUMMARY

This disclosure describes techniques that include collecting data for a network and using the collected data to train and utilize machine learning (ML) models to generate predictions regarding the network. The predictions may provide insights into one or more aspects of the network, such as predicted traffic levels, CPU utilizations, traffic anomalies, and so on. As described herein, a network analysis system for the network may train each respective ML model in a predetermined plurality of ML models to generate, based on the data, a respective training-phase prediction in a plurality of training-phase predictions. The network analysis system may determine a selected ML model in the predetermined plurality of ML models based on evaluation metrics. Additionally, the network analysis system may apply the selected ML model to generate, based on the data, the prediction. The techniques described herein may provide one or more technical advantages. For instance, the techniques described herein may reduce complexity of network analysis systems and may streamline processes for obtaining predictions.

In some examples, this disclosure describes operations performed by a network analysis system or other network system in accordance with one or more aspects of this disclosure. In one specific example, this disclosure describes a method comprising based on a request for a prediction: training, by a computing system, each respective machine learning (ML) model in a predetermined plurality of ML models to generate a respective training-phase prediction in a plurality of training-phase predictions; automatically determining, by the computing system, a selected ML model in the predetermined plurality of ML models based on evaluation metrics for the predetermined plurality of ML models; and applying, by the computing system, the selected ML model to generate the prediction based on data collected from a network that includes a plurality of network devices.

In another example, this disclosure describes a system comprising: a data store configured to store data collected from a network that includes a plurality of network devices; and processing circuitry configured to: based on a request for a prediction: train each respective machine learning (ML) model in a predetermined plurality of ML models to generate a respective training-phase prediction in a plurality of training-phase predictions; automatically determine a selected ML model in the predetermined plurality of ML models based on evaluation metrics for the predetermined plurality of ML models; and apply the selected ML model to generate the prediction based on data collected from a network that includes a plurality of network devices.

In another example, this disclosure describes a non-transitory computer-readable storage medium comprises instructions that, when executed, configure processing circuitry of a computing system to perform operations comprising: based on a request for a prediction: training each respective machine learning (ML) model in a predetermined plurality of ML models to generate a respective training-phase prediction in a plurality of training-phase predictions; automatically determining a selected ML model in the predetermined plurality of ML models based on evaluation metrics for the predetermined plurality of ML models; and applying the selected ML model to generate the prediction based on data collected from a network that includes a plurality of network devices.

DETAILED DESCRIPTION

Figure 1A:
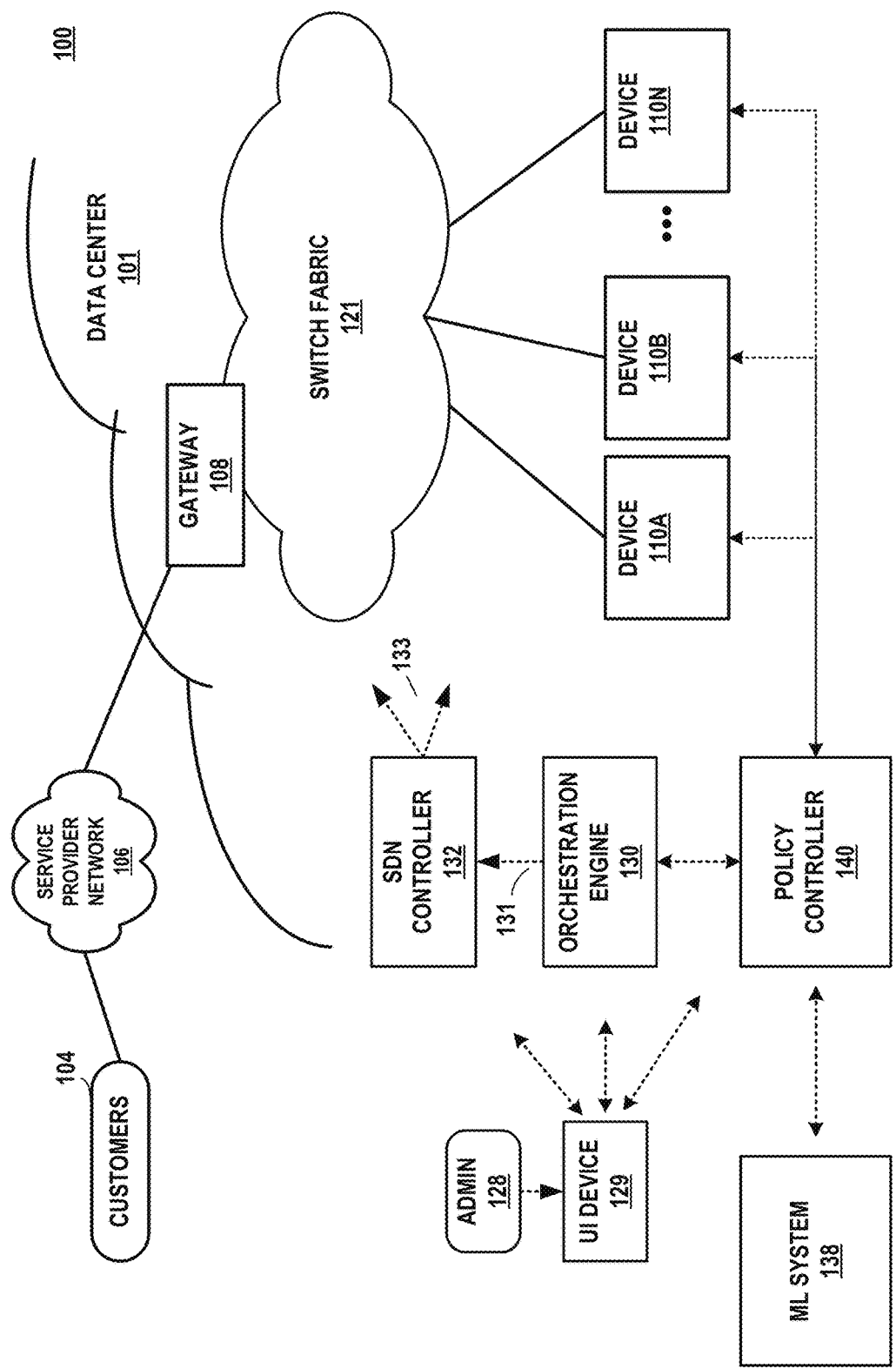
FIG. 1A is a conceptual diagram illustrating an example network that includes a machine learning (ML) system for analyzing a network, in accordance with one or more aspects of the present disclosure.

Data centers that use virtualized environments in which virtual hosts, such as virtual machines or containers are deployed and executed on an underlying compute platform of physical computing devices provide efficiency, cost, and organizational advantages. Yet obtaining meaningful insights into application, node, and link workloads may nevertheless be important in managing any data center fabric. Collecting traffic samples from networking devices may help provide such insights. In various examples described herein, traffic samples are collected and then processed by analytics algorithms to generate various types of predictions. The predictions may include data indicate utilization rates of specific communication links or devices within the network, volumes of specific flows within the network, and so on. The predictions may relate to future or current conditions of the network.

Additionally, network administrators may wish to obtain predictions regarding the network. For example, a network administrator may wish to obtain a prediction about how much data will pass through a particular communication link within the network at a specific time or during a specific time period in the future. In another example, a network administrator may wish to obtain a prediction about how much data will pass through a particular virtual network at a specific time or during a specific time period in the future. In another example, a network administrator may wish to know whether or not a specific node or set of nodes (or link or set of links) will exceed a resource utilization threshold.

It may be desirable to use machine learning (ML) models to generate such a prediction. An ML model may be trained to generate a prediction based on data, such as flow data, collected from a network. Different ML models may be needed to generate different types of predictions. Moreover, different types of ML models may be better suited than other types of ML models to generate specific types of predictions. Accordingly, network administrators may configure a ML system for the network to use ML models on an ad hoc basis to obtain different predictions. Adding ML models on an ad hoc basis may increase the complexity and storage requirements of the ML system. For instance, various software packages may need to be installed on the ML system to support various ML models. The number and sizes of these software packages may not be known in advance. Moreover, the complexity of the ML system may be increased because there is not uniformity in the ML system for training ML models. Furthermore, from the perspective of a network administrator or client, it may be difficult to determine in advance what type of ML model is best suited for generating a particular type of network insight. Determining types of ML models and training the ML models to generate a specific network insight may be a challenging and time-consuming process.

The techniques of this disclosure may address one or more of the challenges described above. For instance, in accordance with an example of this disclosure, a computing system, such as a flow controller, may collect data for a network having a plurality of network devices. For example, the computing system may collect flow data from the network. The flow data may include underlay flow data, overlay flow data, and/or other types of flow data. The computing system may store the data in a database. Furthermore, based on a request for a prediction that is received by the computing system, a ML system may train each respective ML model in a predetermined plurality of ML models to generate a respective training-phase prediction in a plurality of training-phase predictions. The network analysis system may automatically determine a selected ML model in the plurality of ML models based on evaluation metrics for the plurality of ML models. Additionally, the network analysis system may apply the selected ML model to generate the prediction based on the data collected from the network.

By training multiple ML models from a predetermined set of ML models, complexity of the network analysis system may be reduced, e.g., because it may not be necessary to add ML models on an ad hoc basis. Moreover, by automatically selecting an ML model, it may be easier for an administrator to select an appropriate ML model to generate a prediction. In some examples, the network analysis system may be able to automatically train the ML models, select an ML model, and provide a prediction based only on a request for the prediction.

FIG. 1A is a conceptual diagram illustrating an example network that includes an ML system 138 for analyzing a network, in accordance with one or more aspects of the present disclosure. FIG. 1A illustrates one example implementation of a network system 100 and a data center 101 that hosts one or more computing networks, computing domains or projects, and/or cloud-based computing networks generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network system 100 and data center 101 may be appropriate in other instances. Such implementations may include a subset of the components included in the example of FIG. 1A and/or may include additional components not shown in FIG. 1A.

In the example of FIG. 1A, data center 101 provides an operating environment for applications and services for customers 104 coupled to data center 101 by service provider network 106. Although functions and operations described in connection with network system 100 of FIG. 1A may be illustrated as being distributed across multiple devices in FIG. 1A, in other examples, the features and techniques attributed to one or more devices in FIG. 1A may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1A or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers and may thus form part of a large-scale public network infrastructure, e.g., the Internet.

In some examples, data center 101 may represent one of many geographically distributed network data centers. As illustrated in the example of FIG. 1A, data center 101 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 101 is an individual network server, a network peer, or otherwise.

In the example of FIG. 1A, data center 101 includes a set of storage systems, application servers, compute nodes, or other devices, including network device 110A through network device 110N (collectively "network devices 110," representing any number of network devices). Devices 110 may be interconnected via high-speed switch fabric 121 provided by one or more tiers of physical network switches and routers. In some examples, devices 110 may be included within fabric 121, but are shown separately for ease of illustration. Network devices 110 may be any of a number of different types of network devices (core switches, spine network devices, leaf network devices, edge network devices, or other network devices), but in some examples, one or more devices 110 may serve as physical compute nodes of the data center. For example, one or more of devices 110 may provide an operating environment for execution of one or more customer-specific virtual machines or other virtualized instances, such as containers. In such an example, one or more of devices 110 may be alternatively referred to as a host computing device or, more simply, as a host. A network device 110 may thereby execute one or more virtualized instances, such as virtual machines, containers, or other virtual execution environment for running one or more services, such as virtualized network functions (VNFs).

In general, each of network devices 110 may be any type of device that may operate on a network and which may generate data (e.g., flow data, such as sFlow data) accessible through telemetry or otherwise, which may include any type of computing device, sensor, camera, node, surveillance device, or other device. Further, some or all of network devices 110 may represent a component of another device, where such a component may generate data collectible through telemetry or otherwise. For example, some or all of network devices 110 may represent physical or virtual network devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 101 and customers 104 by service provider network 106. Gateway 108 acts to forward and receive packets between switch fabric 121 and service provider network 106.

Software-Defined Networking ("SDN") controller 132 provides a logically and in some cases a physically centralized controller for facilitating operation of one or more virtual networks within data center 101 in accordance with one or more examples of this disclosure. In some examples, SDN controller 132 operates in response to configuration input received from orchestration engine 130 via northbound API 131, which in turn may operate in response to configuration input received from an administrator 128 interacting with and/or operating user interface device 129.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than controller 201. In such examples, user interface device 129 may communicate with controller 201 over a network or other means of communication. In other examples, user interface device 129 may be a local peripheral of controller 201 or may be integrated into controller 201.

In some examples, orchestration engine 130 manages functions of data center 101 such as compute, storage, networking, and application resources. For example, orchestration engine 130 may create a virtual network for a tenant within data center 101 or across data centers. Orchestration engine 130 may attach virtual machines (VMs) to a tenant's virtual network. Orchestration engine 130 may connect a tenant's virtual network to an external network, e.g., the Internet or a VPN. Orchestration engine 130 may implement a security policy across a group of VMs or to the boundary of a tenant's network. Orchestration engine 130 may deploy a network service (e.g., a load balancer) in a tenant's virtual network.

In some examples, SDN controller 132 manages the network and networking services such load balancing, security, and may allocate resources from devices 110 that serve as host devices to various applications via southbound API 133. That is, southbound API 133 represents a set of communication protocols utilized by SDN controller 132 to make the actual state of the network equal to the desired state as specified by orchestration engine 130. For example, SDN controller 132 may implement high-level requests from orchestration engine 130 by configuring physical switches, e.g., TOR switches, chassis switches, and switch fabric 121; physical routers; physical service nodes such as firewalls and load balancers; and virtual services such as virtual firewalls in a VM. SDN controller 132 maintains routing, networking, and configuration information within a state database.

Policy controller 140 interacts with one or more of devices 110 (and/or other devices) to collect data across data center 101 and/or network system 100. The collected data may include flow data. Such flow data may include underlay flow data and overlay flow data. In some examples, the underlay flow data may be collected through samples of flow data collected at Layer 2 of the OSI model. Overlay flow data may be data (e.g., samples of data) derived from overlay traffic across one or more virtual networks established within network system 100. Overlay flow data may, for example, include information identifying a source virtual network and a destination virtual network. Other types of collected data may include data regarding utilization of computational resources (such as processors, memory, storage space, link bandwidth, etc.), packet throughput information for physical or virtual machines, power consumption information, and so on.

In accordance with one or more aspects of the present disclosure, policy controller 140 of FIG. 1A may configure each of devices 110 to collect the data. For instance, in an example that can be described with reference to FIG. 1A, policy controller 140 outputs a signal to each of devices 110. Each of devices 110 receives a signal and interprets the signal as a command to collect data. Thereafter, each of devices 110 communicates the data to policy controller 140. Policy controller 140 receives the data, prepares the data for use in response to analytical queries, and stores the data. In the example of FIG. 1A, other network devices, including network devices within switch fabric 121 (and not specifically shown), may also be configured to collect data, such as underlay flow data, overlay flow data, or other types of data.

Policy controller 140 may receive requests for information about network system 100. For instance, in the example being described, user interface device 129 detects input and outputs information about the input to policy controller 140. Policy controller 140 determines that the information corresponds to a request for information about network system 100, such as a request from a user of user interface device 129 or other source. Policy controller 140 may use ML system 138 to process requests. Policy controller 140 may generate a response to the request and outputs information about the response to user interface device 129.

In the example of FIG. 1A, ML system 138 is implemented in a separate computing system from policy controller 140. For instance, in one example, ML system 138 may be implemented in a computing system at a premises of a user of services provided by data center 101 and policy controller 140 may be implemented in a cloud-based computing system. Policy controller 140 may be implemented in a computing system at a premises of a user of services provided by data center 101 and ML system 138 may be implemented in a cloud-based computing system. In other examples, ML system 138 and policy controller 140 may be implemented on a same computing system. Furthermore, in some examples, ML system 138 may form part of policy controller 140.

In accordance with one or more techniques of this disclosure, in response to a request for a prediction, ML system 138 may train each respective ML model in a predetermined plurality of ML models to generate, a respective training-phase prediction in a plurality of training-phase predictions. Additionally, ML system 138 may automatically determine a selected ML model in the predetermined plurality of ML models based on evaluation metrics for the predetermined plurality of ML models. ML system 138 may apply the selected ML model to generate the prediction based on the data collected from a network (e.g., network system 100) that includes a plurality of network devices (e.g., devices 110). In some examples, ML system 138 may provide the prediction to policy controller 140. Policy controller 140 may process the prediction to generate a response to the request.

Figure 1B:
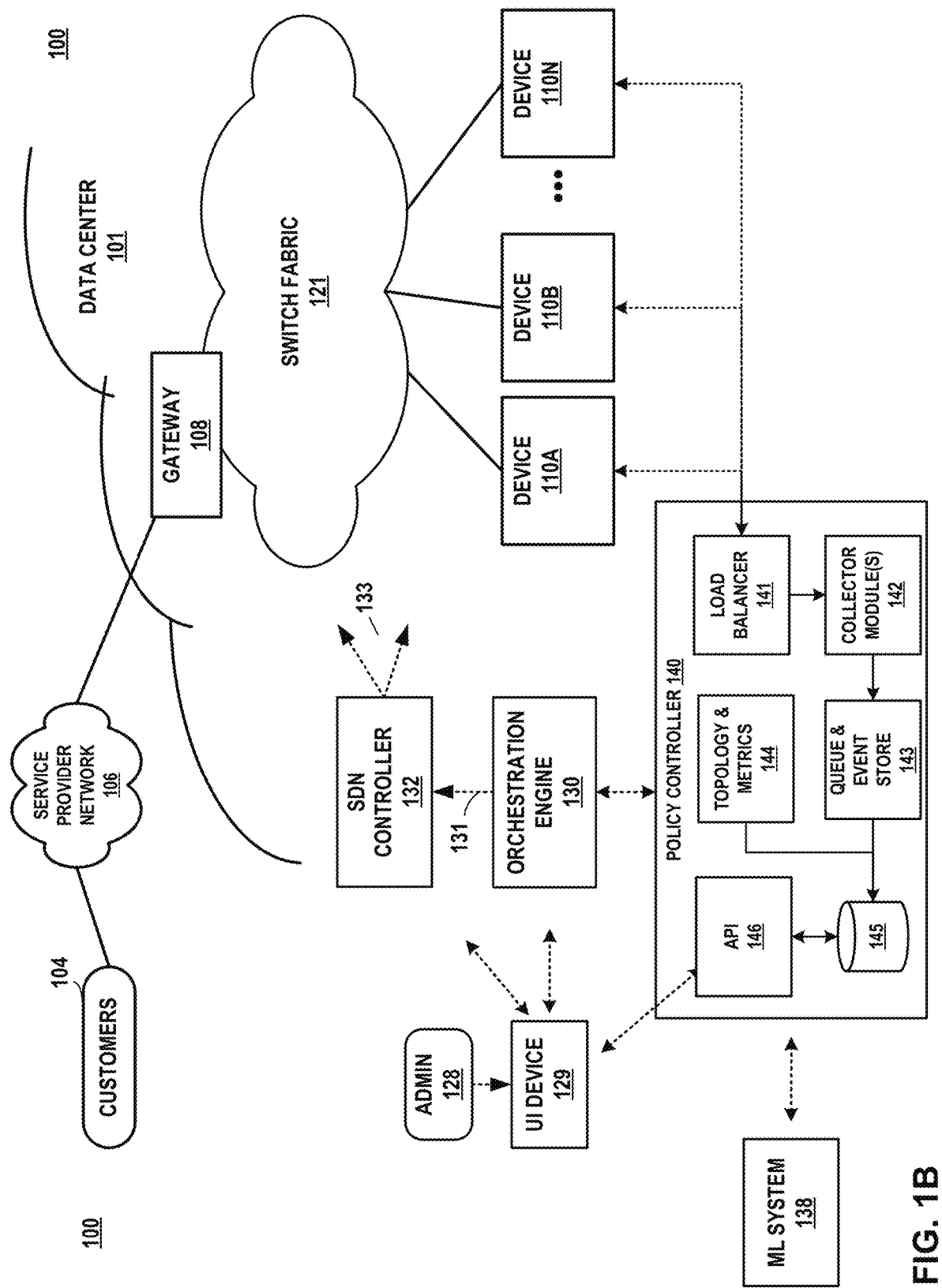
FIG. 1B a conceptual diagram illustrating example components of a system for analyzing a network, in accordance with one or more aspects of the present disclosure.

FIG. 1B a conceptual diagram illustrating example components of a system for analyzing a network, in accordance with one or more aspects of the present disclosure. FIG. 1B includes many of the same elements described in connection with FIG. 1A. Elements illustrated in FIG. 1B may correspond to elements illustrated in FIG. 1A that are identified by like-numbered reference numerals in FIG. 1A. In general, such like-numbered elements may be implemented in a manner consistent with the description of the corresponding element provided in connection with FIG. 1A, although in some examples, such elements may involve alternative implementation with more, fewer, and/or different capabilities and attributes.

FIG. 1B illustrates example components of policy controller 140. Policy controller 140 is shown as including load balancer 141, collector module(s) 142, queue & event store 143, topology & metrics source 144, data store 145, and API 146. This disclosure may also refer to data store 145 as a time-series database and may refer to API 146 as a decision endpoint. In general, policy controller 140 and components of policy controller 140 are designed and/or configured to ensure high availability and an ability to process a high volume of data, such as flow data. In some examples, multiple instances of components of policy controller 140 may be orchestrated (e.g., by orchestration engine 130) to execute on different physical servers to ensure that there is no single point of failure for any component of policy controller 140. In some examples, policy controller 140 or components thereof may be scaled independently and horizontally to enable efficient and/or effective processing of a desired volume of traffic (e.g., flow data).

Policy controller 140 of FIG. 1B may, as in FIG. 1A, configure each of devices 110 to collect data, such as flow data or other types of data. For instance, policy controller 140 may output a signal to each of devices 110 to configure each of devices 110 to collect the data. One or more of devices 110 may thereafter collect the data and report such data to policy controller 140.

In FIG. 1B, load balancer 141 of policy controller 140 of receives the data from devices 110. Load balancer 141 may distribute the received data across multiple collector module(s) 142 to ensure an active/active failover strategy for the collector modules. In some examples, multiple load balancers 141 may be required to ensure high availability and scalability.

Collector module(s) 142 collect data from load balancer 141. Collector module(s) 142 send the data upstream to queue & event store 143. In some examples where the data includes flow data, collector module(s) 142 may address, process, and/or accommodate unified data from sFlows, NetFlow v9, IPFIX, jFlow, Contrail Flow, and other formats. Collector module(s) 142 may be capable of parsing the inner header from sFlow packets and other data flow packets. Collector module(s) 142 may be able to handle message overflows, enriched flow records with topology information (e.g., AppFormix topology information). Collector module(s) 142 may also be able to convert data to binary format before writing or sending data to queue & event store 143. Underlay flow data of the "sFlow" type, which refers to a "sampled flow," is a standard for packet export at Layer 2 of the OSI model. sFlow provides a means for exporting truncated packets, together with interface counters for the purpose of network monitoring.

Queue & event store 143 processes the collected data. For example, queue & event store 143 may receive data from one or more collector module(s) 142, store the data, and make the data available for ingestion in data store 145. In some examples, this enables separation of the task of receiving and storing large volumes of data from the task of indexing the data and preparing the data for analytical queries. In some examples, queue & event store 143 may also enable independent users to directly consume the data. In some examples, queue & event store 143 may be used to discover anomalies and produce alerts in real time. In some examples where the data includes flow data, the flow data may be parsed by reading encapsulated packets, including VXLAN, MPLS over UDP, and MPLS over GRE. For instance, from the inner (underlay) packet, queue & event store 143 parses the source IP, destination IP, source port, destination port, and protocol. Some types of flow data (including sFlow data) include only a fragment of sampled network traffic (e.g., the first 128 bytes), so in some cases, the flow data might not include all of the inner fields. In such an example, such data may be marked as missing.

Topology & metrics source 144 may enrich or augment the data with topology information and/or metrics information. For example, topology & metrics source 144 may provide network topology metadata, which may include identified nodes or network devices, configuration information, configuration, established links, and other information about such nodes and/or network devices. In some examples, topology & metrics source 144 may use AppFormix topology data or may be an executing AppFormix module. The information received from topology & metrics source 144 may be used to enrich data collected by collector module(s) 142 and support API 146 in processing queries of data store 145.

Data store 145 may be configured to store data received from queue & event store 143 and topology & metrics source 144 in an indexed format, enabling fast aggregation queries and fast random-access data retrieval. In some examples, data store 145 may achieve fault tolerance and high availability by sharding and replicating the data.

API 146 may process requests sent by one or more user interface devices 129. For instance, in some examples, API 146 may receive a request from user interface device 129 through an HTTP POST request. In some examples, API 146 may implement a Representational State Transfer (REST) API.

In accordance with one or more techniques of this disclosure, API 146 may receive a request for a prediction. The prediction may include one or more predictions regarding future conditions of network system 100, may include data regarding current or past conditions of network system 100, or may include other types of data derived at least in part from data collected by collector module(s) 142. Example types of predictions may include predictions regarding workloads in subsequent time periods, predictions regarding capacity requirements for the network, and so on.

Based on the request, ML system 138 may train each respective ML model in a plurality of ML models to generate (e.g., based on data stored in data store 145 or provided training data), a respective training-phase prediction in a plurality of training-phase predictions. ML system 138 may automatically determine a selected ML model in the plurality of ML models based on evaluation metrics for the plurality of ML models. After selecting the ML model, ML system 138 may apply the selected ML model to generate the prediction based on data stored in data store 145.

API 146 may return a response based on the prediction to UI device 129. In some examples, API 146 may process the prediction to determine whether to generate an alert. For example, API 146 may determine whether to generate an alert based on comparisons of one or more values in the prediction to corresponding thresholds. API 146 may provide the alert to UI device 129, e.g., in the form of a pop-up notification, an email message, an instant message, a text or graphical message in a user interface, or on another form. Example types of alerts may include alerts of anomalous network traffic. In some examples, orchestration engine 130, SDN controller 132, or other systems may perform automated decision execution in response to predictions.

By implementing the techniques of this disclosure, the process of generating predictions may be regularized. For example, ML system 138 may select the ML model from a predetermined set of ML models, as opposed to a set of ad hoc ML models generated on a case-by-case basis. By using the predetermined set of ML models, it may be possible to simplify the storage requirements for ML system 138 because there might not be need to store, support, and maintain various software packages needed to support individual ML models that are added on an ad hoc basis. In some examples, ML system 138 implements standardized training workflows and production workflows for requests. The workflows are described in greater detail elsewhere in this disclosure. Use of such standardized training workflows may simplify the software infrastructure that would otherwise be needed to support use of ad hoc ML models. Simplifying the software infrastructure may reduce the data storage requirements of ML system 138. The techniques of this disclosure may also make the generation of predictions easier for users. Creating ad hoc models for each new case requires extensive amount of research and understanding for creating an accurate model for prediction. The techniques of this disclosure may use multiple major widely known algorithms, trains, and selects an accurate ML model for prediction, which may save hours of time and effort for any unknown metric prediction.

Figure 2:
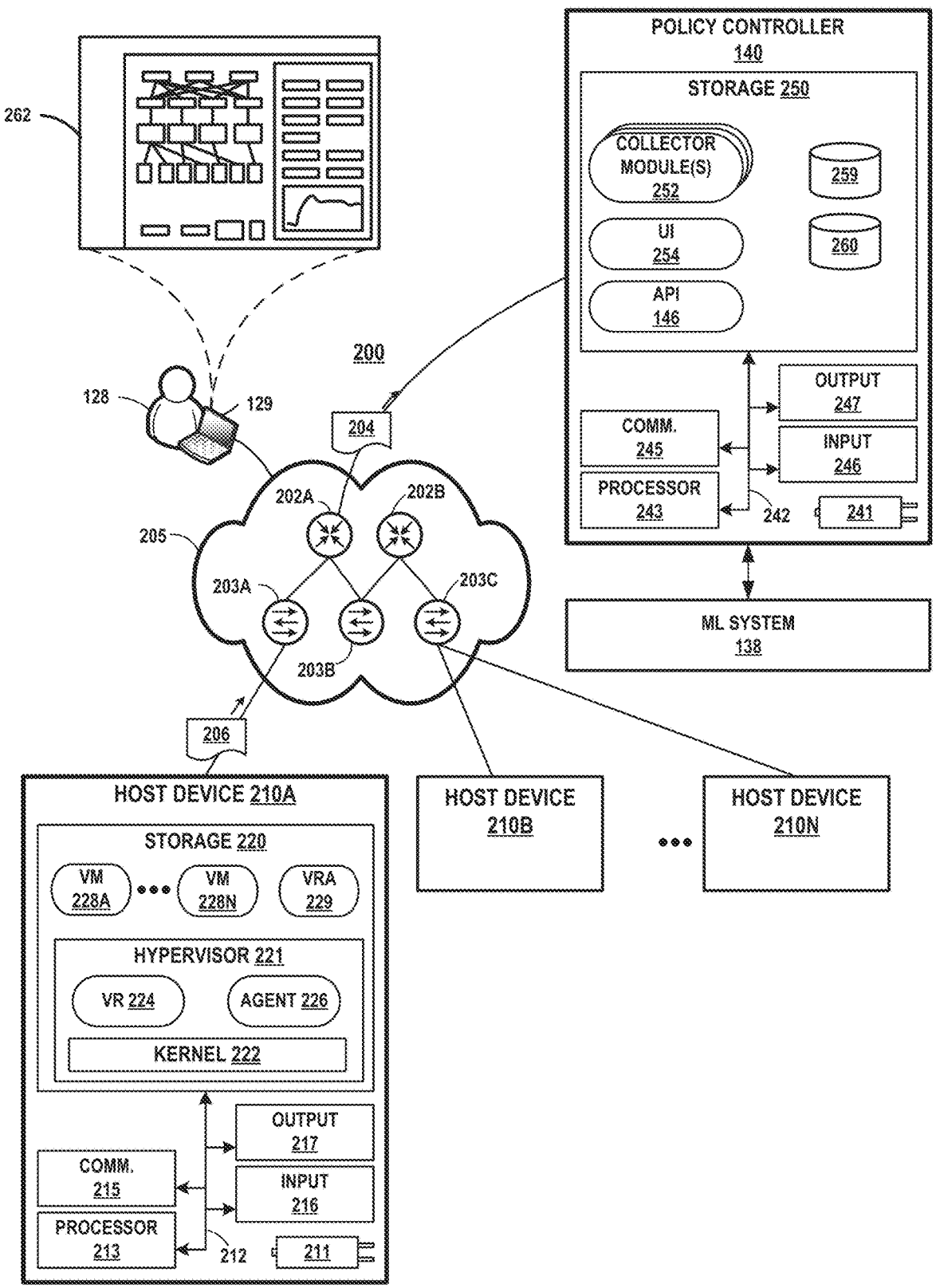
FIG. 2 is a block diagram illustrating an example network for analyzing a network, in accordance with one or more aspects of the present disclosure.

FIG. 2 is a block diagram illustrating an example network for analyzing a network, in accordance with one or more aspects of the present disclosure. Network system 200 of FIG. 2 may be described as an example or alternative implementation of network system 100 of FIG. 1A or FIG. 1B. One or more aspects of FIG. 2 may be described herein within the context of FIG. 1.

Although a data center, such as that illustrated in FIG. 1A, FIG. 1B, and FIG. 2 may be operated by any entity, some data centers are operated by a service provider, where the business model of such a service provider is to provide computing capacity to its clients. For this reason, data centers usually contain a large number of compute nodes, or host devices. In order to operate efficiently, those hosts have the ability to be connected to each other and to the external world, and that ability is provided through physical network devices, which may be interconnected in a leaf-spine topology. The collection of these physical devices, such as network devices and hosts, form the underlay network.

Each host device in such a data center usually has several virtual machines running on it, which are called workloads. Clients of the data center usually have access to these workloads and can install applications and perform other operations using such workloads. Workloads that run on different host devices but are accessible by one particular client are organized into a virtual network. Each client usually has at least one virtual network. Those virtual networks are also called overlay networks. In some cases, a client of the data center may experience connectivity issues between two applications that are running on different workloads. Troubleshooting such issues tends to be complicated by the deployment of the workloads in a large multi-tenant data center.

In the example of FIG. 2, network 205 connects policy controller 140, host device 210A, host device 210B, and host device 210N. Policy controller 140 may correspond to an example or alternative implementation of policy controller 140 illustrated in FIG. 1A and FIG. 1B. Host devices 210A, 210B, through 210N may be collectively referenced as "host devices 210," representing any number of host devices 210.

Each of host devices 210 may be an example of devices 110 of FIG. 1A and FIG. 1B, but in the example of FIG. 2, each of host devices 210 is implemented as a server or host device that operates as a compute node of a virtualized data center, as opposed to a network device. Thus, in the example of FIG. 2, each of host devices 210 executes multiple virtual computing instances, such as virtual machines 228.

Also connected to network 205 is user interface device 129, which may be operated by administrator 128, as in FIG. 1A and FIG. 1B. In some examples, user interface device 129 may present, at a display device associated with user interface device 129, one or more user interfaces, some of which may have a form similar to user interface 262.

FIG. 2 also illustrates underlay flow data 204 and overlay flow data 206 flowing within network system 200. In particular, underlay flow data 204 is shown leaving spine device 202A and flowing to policy controller 140. Similarly, overlay flow data 206 is shown leaving host device 210A and flowing across network 205. In some examples, overlay flow data 206 is communicated through network 205 and to policy controller 140 as described herein. For simplicity, FIG. 2 illustrates a single instance of underlay flow data 204 and a single instance of overlay flow data 206. However, it should be understood that each of spine devices 202 and leaf devices 203 may generate and communicate underlay flow data 204 to policy controller 140, and in some examples, each of host devices 210 (and/or other devices) may generate underlay flow data 204 and communicate such data across network 205 to policy controller 140. Further, it should be understood that each of host devices 210 (and/or other devices) may generate overlay flow data 206 and communicate such data over network 205 to policy controller 140.

Network 205 may correspond to any of switch fabric 121 and/or service provider network 106 of FIG. 1A and FIG. 1B, or alternatively, may correspond to a combination of switch fabric 121, service provider network 106, and/or another network. Network 205 may also include some of the components of FIG. 1A and FIG. 1B, including gateway 108, SDN controller 132, and orchestration engine 130.

Illustrated within network 205 are spine devices 202A and 202B (collectively "spine devices 202" and representing any number of spine devices 202), as well as leaf device 203A, 203B, and leaf device 203C (collectively "leaf devices 203" and also representing any number of leaf devices 203). Although network 205 is illustrated with spine devices 202 and leaf devices 203, other types of network devices may be included in network 205, including core switches, edge network devices, top-of-rack devices, and other network devices.

In general, network 205 may be the internet, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Policy controller 140 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, policy controller 140 represents a cloud computing system, server farm, and/or server cluster (or portion thereof) that provides services to client devices and other devices or systems. In other examples, policy controller 140 may represent or be implemented through one or more virtualized compute instances (e.g., virtual machines, containers) of a data center, cloud computing system, server farm, and/or server cluster.

In the example of FIG. 2, policy controller 140 may include power source 241, one or more processors 243, one or more communication units 245, one or more input devices 246, and one or more output devices 247. Storage devices 250 may include one or more collector modules 252, a user interface module 254, an API 146, a data store 259, and an ML-related database 260. In some examples, ML-related database 260 is separate from policy controller 140. For instance, ML-related database 260 may be included in ML system 138. Furthermore, in some examples, ML-related database 260 may be a metadata store.

One or more of the devices, modules, storage areas, or other components of policy controller 140 may be interconnected to enable inter-component communications (physically, communicatively, and/or operatively). In some examples, such connectivity may be provided through communication channels (e.g., communication channels 242), a system bus, a network connection, an inter-process communication data structure, or any other method for communicating data.

Power source 241 may provide power to one or more components of policy controller 140. Power source 241 may receive power from the primary alternating current (AC) power supply in a data center, building, home, or other location. In other examples, power source 241 may be a battery or a device that supplies direct current (DC). In still further examples, policy controller 140 and/or power source 241 may receive power from another source. One or more of the devices or components illustrated within policy controller 140 may be connected to power source 241, and/or may receive power from power source 241. Power source 241 may have intelligent power management or consumption capabilities, and such features may be controlled, accessed, or adjusted by one or more modules of policy controller 140 and/or by one or more processors 243 to intelligently consume, allocate, supply, or otherwise manage power.

One or more processors 243 of policy controller 140 may implement functionality and/or execute instructions associated with policy controller 140 or associated with one or more modules illustrated herein and/or described herein. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Policy controller 140 may use one or more processors 243 to perform operations in accordance with one or more aspects of the present disclosure using software, hardware, firmware, or a mixture of hardware, software, and firmware residing in and/or executing at policy controller 140.

One or more communication units 245 of policy controller 140 may communicate with devices external to policy controller 140 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of policy controller 140 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera, etc.).

One or more output devices 247 may represent any output devices of policy controller 140 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator, etc.).

One or more storage devices 250 within policy controller 140 may store information for processing during operation of policy controller 140. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of policy controller 140 and/or one or more devices or systems illustrated as being connected to policy controller 140.

In some examples, one or more storage devices 250 are implemented through temporary memory, which may mean that a primary purpose of the one or more storage devices is not long-term storage. Storage devices 250 of policy controller 140 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Collector module(s) 252 may perform functions relating to receiving both underlay flow data 204 and overlay flow data 206, and performing load balancing as necessary to ensure high availability, throughput, and scalability for collecting such flow data. Collector modules 252 may process the data prepare the data for storage within data store 259. In some examples, collector module(s) 252 may store the data within data store 259. Data store 259 may be equivalent to data store 145 (FIG. 1B).

User interface module 254 may perform functions relating to generating user interfaces for presenting the results of analytical queries performed by API 146. In some examples, user interface module 254 may generate information sufficient to generate a set of user interfaces, and cause communication unit 215 to output such information over network 205 for use by user interface device 129 to present one or more user interfaces at a display device associated with user interface device 129.

API 146 may perform analytical queries involving data stored in data store 259 that is derived from collection of underlay flow data 204, overlay flow data 206, and/or other types of data. In some examples, API 146 may receive a request in the form of information derived from an HTTP POST request, and in response, may use ML system 138 to obtain a prediction that is responsive to the request. In some examples, the request includes a query or another data structure that specifies the data to be included in the prediction. Further, in some examples, API 146 may fetch topology information pertaining to the devices 110, and perform analytics that include data deduplication, overlay-underlay correlation, traffic path identification, and heatmap traffic calculation.

Data store 259 may represent any suitable data structure or storage medium for storing information related to data flow information, including storage of data derived from underlay flow data 204 and overlay flow data 206. Data store 259 may be responsible for storing data in an indexed format, enabling fast data retrieval and execution of queries. The information stored in data store 259 may be searchable and/or categorized such that one or more modules within policy controller 140 may provide an input requesting information from data store 259, and in response to the input, receive information stored within data store 259. Data store 259 may be primarily maintained by collector module(s) 252. Data store 259 may be implemented through multiple hardware devices, and may achieve fault tolerance and high availability by sharding and replicating data. In some examples, data store 259 may be implemented using the open source ClickHouse column-oriented database management system.

Each of host devices 210 represents a physical computing device or compute node that provides an execution environment for virtual hosts, virtual machines, containers, and/or other virtualized computing resources. In some examples, each of host devices 210 may be a component of a cloud computing system, server farm, and/or server cluster (or portion thereof) that provides services to client devices and other devices or systems.

Certain aspects of host devices 210 are described herein with respect to host device 210A. Other host devices 210 (e.g., host device 210B through 210N) may be described similarly, and may also include the same, similar, or corresponding components, devices, modules, functionality, and/or other features. Descriptions herein with respect to host device 210A may therefore correspondingly apply to one or more other host devices 210 (e.g., host device 210B through host device 210N).

In the example of FIG. 2, host device 210A includes underlying physical compute hardware that includes power source 211, one or more processors 213, one or more communication units 215, one or more input devices 216, one or more output devices 217, and one or more storage devices 220. Storage devices 220 may include hypervisor 221, including kernel module 222, virtual router module 224, and agent module 226. Virtual machines 228A through 228N (collectively "virtual machines 228" and representing any number of virtual machines 228) execute on top of hypervisor 221 or are controlled by hypervisor 221. Similarly, virtual router agent 229 may execute on, or under the control of, hypervisor 221. One or more of the devices, modules, storage areas, or other components of host device 210 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of host device 210. Processor 213 may implement functionality and/or execute instructions associated with host device 210. Communication unit 215 may communicate with other devices or systems on behalf of host device 210. One or more input devices 216 and output devices 217 may represent any other input and/or output devices associated with host device 210. Storage devices 220 may store information for processing during operation of host device 210A. Each of such components may be implemented in a manner similar to those described herein in connection with policy controller 140 or otherwise.

Hypervisor 221 may serve as a module or system that instantiates, creates, and/or executes one or more virtual machines 228 on an underlying host hardware device. In some contexts, hypervisor 221 may be referred to as a virtual machine manager (VMM). Hypervisor 221 may execute within the execution environment provided by storage devices 220 and processors 213 or on top of an operating system kernel (e.g., kernel module 222). In some examples, hypervisor 221 is an operating system-level component that executes on a hardware platform (e.g., host 210) to provide a virtualized operating environment and orchestration controller for virtual machines 228, and/or other types of virtual computing instances. In other examples, hypervisor 221 may be a software and/or firmware layer that provides a lightweight kernel and operates to provide a virtualized operating environment and orchestration controller for virtual machines 228, and/or other types of virtual computing instances. Hypervisor 221 may incorporate the functionality of kernel module 222 (e.g., as a "type 1 hypervisor"), as shown in FIG. 2. In other examples, hypervisor 221 may execute on a kernel (e.g., as a "type 2 hypervisor").

Virtual router module 224 may execute multiple routing instances for corresponding virtual networks within data center 101 and may route packets to appropriate virtual machines executing within the operating environment provided by devices 110. Virtual router module 224 may also be responsible for collecting overlay flow data, such as Contrail Flow data when used in an infrastructure in which the Contrail SDN is employed. Accordingly, each of host devices 210 may include a virtual router. Packets received by virtual router module 224 of host device 210A, for instance, from the underlying physical network fabric may include an outer header to allow the physical network fabric to tunnel the payload or "inner packet" to a physical network address for a network interface of host device 210A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

Agent module 226 may execute as part of hypervisor 221 or may execute within kernel space or as part of kernel module 222. Agent module 226 may monitor some or all of the performance metrics associated with host device 210A, and may implement and/or enforcing policies, which may be received from policy controller 140. Agent module 226 may configure virtual router module 224 to communicate overlay flow data to policy controller 140.

Virtual machine 228A through virtual machine 228N (collectively "virtual machines 228," representing any number of virtual machines 228) may represent example instances of virtual machines 228. Host device 210A may partition the virtual and/or physical address space provided by storage device 220 into user space for running user processes. Host device 210A may also partition a virtual and/or physical address space provided by storage device 220 into a kernel space, which is protected and may be inaccessible by user processes.

In general, each of virtual machines 228 may be any type of software application and each may be assigned a virtual address for use within a corresponding virtual network, where each of the virtual networks may be a different virtual subnet provided by virtual router module 224. Each of virtual machines 228 may be assigned its own virtual layer three (L3) IP address, for example, for sending and receiving communications but is unaware of an IP address of the physical server on which the virtual machine is executing. In this way, a "virtual address" is an address for an application that differs from the logical address for the underlying, physical computer system, e.g., host device 210A in the example of FIG. 2.

Each of virtual machines 228 may represent a tenant virtual machine running customer applications such as Web servers, database servers, enterprise applications, or hosting virtualized services used to create service chains. In some cases, any one or more of host devices 210 or another computing device hosts customer applications directly, i.e., not as virtual machines. Although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on host devices 210.

Virtual router agent 229 is included within host device 210A in the example of FIG. 2 and may communicate with SDN controller 132 and virtual router module 224 so as to control the overlay of virtual networks and coordinate the routing of data packets within host device 210A. In general, virtual router agent 229 communicates with SDN controller 132, which generates commands to control routing of packets through data center 101. Virtual router agent 229 may execute in user space and operate as a proxy for control plane messages between virtual machines 228 and SDN controller 132. For example, virtual machine 228A may request to send a message using its virtual address via virtual router agent 229, and virtual router agent 229 may in turn send the message and request that a response to the message be received for the virtual address of virtual machine 228A, which originated the first message. In some cases, virtual machine 228A may invoke a procedure or function call presented by an application programming interface of virtual router agent 229, and in such an example, virtual router agent 229 handles encapsulation of the message as well, including addressing.

Policy controller 140 may store data, such as underlay flow data 204 and overlay flow data 206, in data store 259. For instance, in FIG. 2, collector module(s) 252 outputs information to data store 259. Data store 259 may store the data in indexed format, enabling fast aggregation queries and fast random-access data retrieval. In some examples, data store 259 may achieve fault tolerance and high availability by sharding and replicating the data across multiple storage devices, which may be located across multiple physical hosts.

Policy controller 140 may receive a request. For instance, user interface device 129 detects input and outputs, over network 205, a signal derived from the input. Communication unit 215 of policy controller 140 detects a signal and outputs information about the signal to API 146. API 146 determines that the signal corresponds to a request from a user of user interface device 129 for information about network system 200 for a given time window. For example, a user of user interface device 129 (e.g., administrator 128) may want to obtain a prediction about an expected level of network traffic that will be sent by a specific one of host devices 210 during a particular time period in the future. For instance, if the specific host device hosts a video streaming service, the user may want to know how much network traffic the specific host device will likely send on an upcoming Sunday evening, given past traffic patterns on network 205.

In some examples, API 146 of policy controller 140 receives requests from a system, such as a software system or device, without human involvement. For example, an application or other type of program running on user interface device 129, a device of policy controller 140, or another device may automatically send the request. In such examples, policy controller 140 may receive the same request on a periodic- or event-driven basis. In some examples, API 146 may receive requests from orchestration engine 130 (e.g., for virtual machine or container analysis), SDN controller 132 (e.g., for switch fabric or connectivity analysis and management), or other systems.

API 146 may use ML system 138 to process the request for the prediction. To process the request, ML system 138 may determine whether an ML model has already been selected for the request. For example, ML system 138 may store previously received requests, previously processed queries, or other types of data in ML-related database 260. In this example, ML system 138 may compare the request to a library of previously received requests to determine whether an ML model has already been selected for the request.

If an ML model has already been selected for the request, ML system 138 may apply the selected ML model to generate the prediction based on data stored in data store 259. In some examples, if ML system 138 has already selected an ML model for the request, ML system 138 may initiate a production workflow. In such examples, the production workflow is a process that generates the prediction using an ML model that has been previously selected for the request. This disclosure describes the production workflow in greater detail elsewhere in this disclosure, e.g., with respect to FIG. 5.

On the other hand, if ML system 138 has not previously selected an ML model for the request, ML system 138 initiates a training workflow. The training workflow is a process in which ML system 138 trains a plurality of ML models to generate training-phase predictions based on data stored in data store 259. Because collector module(s) 252 continue to collect data and continue to store data in data store 259, the data used by the plurality of ML models to generate training-phase prediction during the training workflow may be different from the data used by a selected ML model to generate the prediction during a production workflow. Furthermore, when performing the training workflow, ML system 138 automatically determine a selected ML model in the predetermined plurality of ML models based on evaluation metrics for the predetermined plurality of ML models. This disclosure describes the production workflow in greater detail elsewhere in this disclosure, e.g., with respect to FIG. 4.

API 146 may be configured to use ML system 138 to process various types of requests. Example types of requests may include, but are not limited to, best model prediction requests, statistical model prediction requests, deep learning model prediction requests, and fine-tuning requests. When ML system 138 processes a best model prediction request, ML system 138 may return a prediction generated by an ML model selected to be the best ML model for the request by ML system 138. The selected ML model used to process a best model prediction request might not limited to a particular type of model, such as a statistical ML model or a deep learning ML model. When ML system 138 processes a statistical model request, ML system 138 may return a prediction generated by a statistical ML model selected by ML system 138 from a plurality of predetermined types of statistical ML models. Similarly, when ML system 138 processes a deep learning model request, ML system 138 may return a prediction generated by a deep learning ML model selected by ML system 138 from a plurality of predetermined types of deep learning ML models.

When ML system 138 processes a fine-tuning request, ML system 138 may perform a fine-tuning process to improve an already-trained ML model. In some examples, API 146 or ML system 138 automatically generates fine-tuning requests or initiate fine-tuning processes. For instance, a fine-tuning processes may be automatically initiated on a nightly basis, an hourly basis, or according to another schedule- or event-driven basis. Example fine-tuning processes are described in greater detail elsewhere in this disclosure.

Policy controller 140 may cause a user interface 262 containing data based on the prediction to be presented at user interface device 129. For example, API 146 may receive the prediction from ML system 138 and output the prediction to user interface module 254. User interface module 254 may use the prediction from API 146 to generate data sufficient to create at least part of user interface 262. For example, user interface module 254 may generate a JavaScript Object Notation (JSON) object that contains data sufficient to create at least part of user interface 262. User interface module 254 causes communication unit 245 to output a signal over network 205 or another network. User interface device 129 detects the signal and processes the signal to generate user interface 262. User interface device 129 presents user interface 262 at a display associated with user interface device 129. The content of user interface 262 shown in the example of FIG. 2 may differ in other examples.

Modules and systems illustrated in FIG. 2 (e.g., virtual router module 224, agent module 226, collector module(s) 252, user interface module 254, API 146, ML system 138) and/or illustrated or described elsewhere in this disclosure may perform operations described using software, hardware, firmware, or a mixture of hardware, software, and firmware residing in and/or executing at one or more computing devices. For example, a computing device or set of computing devices may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
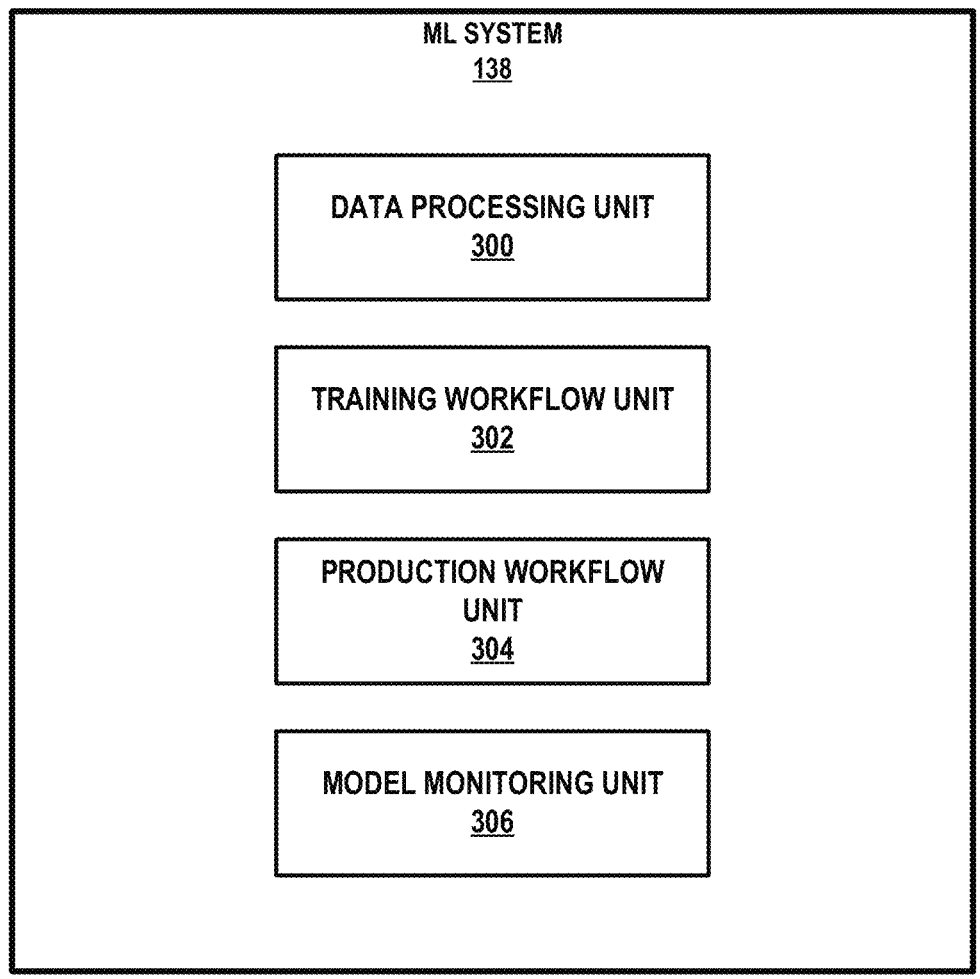
FIG. 3 is a conceptual diagram illustrating example components of a machine learning (ML) system in accordance with one or more aspects of the present disclosure.

FIG. 3 is a conceptual diagram illustrating example components of ML system 138 in accordance with one or more aspects of the present disclosure. In the example of FIG. 3, ML system 138 includes a data processing unit 300, a training workflow unit 302, a production workflow unit 304, and a model monitoring unit 306. In other examples, ML system 138 may include more, fewer, or different units. Each of the components of FIG. 3 may be, for example, implemented in software operating on a computing environment, such as one or more servers, processor, or virtualized execution units (e.g., containers or virtual machines).

Data processing unit 300 is configured to process data from data store 259 for use in one or more ML models. For example, data processing unit 300 may perform dimensionality reduction on the data. For example, input data may include a matrix of size N×M, where N is number of entries and M is dimension of each entry. In this example, if the required input size of one or more of the ML models is K, assuming M>K, data processing unit 300 may use dimensionality reduction algorithms, such as auto-encoders, to reshape the input data from N×M to N×K.

In some examples, data processing unit 300 may perform data pre-processing. Example types of data pre-processing may include filling in not-a-number (NaN) values, normalizing or scaling data, removing noise (e.g., using autoencoders or other tools), zero-centering, min/max normalization, principle component analysis, or other types of processing to get the data ready for use by one or more ML models. Principle component analysis may be useful for decorrelating data for use in linear regression. Principle component analysis may be useful to whiten the data, e.g., by setting a covariance matrix to an identity matrix. In some examples, data processing unit 300 may perform data augmentation to generate additional data based on data from data store 259. For instance, data processing unit 300 may use one or more generative adversarial networks to perform data augmentation. In some examples, the data produced by data processing unit 300 is shareable (or otherwise reusable) among different ML models. Making the data reusable among different ML models may reduce the storage requirements of ML system 138.

Training workflow unit 302 is configured to perform training workflows that train ML models to generate prediction for specific requests received by ML system 138. ML system 138 may utilize training workflow unit 302 during an initial setup of a ML model for a request. In some examples, ML system 138 may use training workflow unit 302 to perform fine-tuning processes that improve selected ML models for specific requests. In some examples, training workflow unit 302 may implement a Kubernetes-based machine learning pipeline.

Training workflow unit 302 may be able to train various types of ML models. For instance, in some examples, training workflow unit 302 is configured to train baseline ML models. A baseline ML model may be a type of ML model other than a deep learning ML models and statistical ML models. Baseline ML models may be able to generate predictions based on limited amounts of data. For example, a baseline ML model may be able to generate a prediction based on less than 1 hour of data (e.g., for hourly predictions). Example types of baseline ML models may include an Exponential Weighted Moving Average (EWMA) model, a Hidden Markov model, and so on.

In some examples, training workflow unit 302 is configured to train statistical ML models. Example types of statistical models include a Holt-Winters model, an autoregressive integrated moving average (ARIMA) model, a seasonal ARIMA model, a vector autoregression (VAR) model, a Facebook PROPHET model, and so on. In some examples, statistical ML models may have greater utility than basic ML models when there is more data available to use to make predictions. For instance, a statistical ML model that is used to generate hourly predictions may be usable when more than 24 hours of data is available.

In some examples, training workflow unit 302 is configured to train deep learning ML models. Deep learning ML models may require more data than basic ML models or statistical ML models but may be able to provide more sophisticated types of predictions. Example types of deep learning ML models may include Long Short-Term Memory (LSTM) models, bi-directional LSTM models, recurrent neural networks, or other types of neural networks that include multiple layers. In other examples, ML system 138 may use neural network models other than deep learning ML models.

The ML models may be grouped as regression-based ML models, classification-based ML models, and unsupervised learning models. There may be baseline, statistical, and deep learning MLs for each of these groups. In some examples, for regression-based ML models, training workflow unit 302 may use a Hodrick-Prescott filter to perform an initial level of ML model selection. Specifically, the Hodrick-Prescott filter breaks time-series data (y_t) into a trend component and a cyclical component c_t: y_t=tou_t(trend)+c_t(cyclical). The time-series data is the data that the ML models use to generate the predictions. By breaking the time-series data into a trend component and a cyclical component, training workflow unit 302 may be able to determine whether the time-series data has more of a cyclic nature or more of a trend nature. If training workflow unit 302 determines that the time-series data has more of a cyclic nature than a trend nature, training workflow unit 302 may eliminate ML models that perform better on time-series data that has a trend nature. Conversely, if training workflow unit 302 determines that the time-series data has more of a trend nature than a cyclic nature, training workflow unit 302 may eliminate ML models that perform better on time-series data that has a cyclic nature. For example, the EWMA model and Holts-Winter model perform better on time-series data that has a cyclic nature. An ARIMA model, a VAR model, etc., may perform better on time-series data that has a trend nature.

By performing this initial level of ML model selection, training workflow unit 302 may be able to avoid training every regression-based ML model, thereby potentially saving time and computational resources. In some examples, training workflow unit 302 may filter the regression-based ML models based on how much data is available. For instance, if there is less than a threshold amount of time's worth of available data in data store 259 (e.g., 24-48 hours), training workflow unit 302 may train only regression-based baseline ML models. Otherwise, if there is more than the threshold amount of time's worth of available in data store 259, training workflow unit 302 may additionally or alternatively train other types of regression-based ML models, such as statistical models or low capacity deep learning ML models.

Example types of regression-based baseline ML models may include a hidden Markov model and season trend decomposition approaches. Example types of regression-based statistical ML models may include Error-Trend-Seasonality (ETS) models (including exponential smoothing models, trend method models, and ETS decomposition), EWMA models (including simple moving averages and EWMA), Holt Winters models, ARIMA models, SARIMA models, vector autoregression models, seasonal trend autoregression (STAR) models, and Facebook PROPHET models. Example types of regression-based deep learning ML models may include LSTM architectures (including single-layer LSTMs, depth LSTMs, bi-directional LSTMs), RNNs, and gated recurrent units (GRUs). Example types of classification-based baseline ML models may include logistic regression models and K-nearest neighbor models. Example types of classification-based statistical ML models may include support vector machines and boosting ensemble algorithms (e.g. XGBoost). Example types of classification-based deep learning ML models may include LSTM architectures, RNN architectures, GRU architectures, and artificial neural network architectures. Example types of unsupervised ML models may include K-means clustering models, Gaussian clustering models, and density-based spatial clustering.

In some examples, training workflow unit 302 begins a training workflow as part of an initial setup of an ML pipeline. An ML pipeline is a process to generating predictions for a request. Thus, when ML system 138 receives a new request, ML system 138 performs an initial setup process of an ML pipeline for generation of predictions for the new request.

In some examples, training workflow unit 302 begins a training workflow in response to a new instance of a previously received request. For example, some the predictions for some types of requests may be best generated by a basic ML model or a statistical ML model. For example, the prediction for a request may include a prediction about what traffic on a communication link in network 205 will be during the next hour based on traffic on the communication link during the past hour. In this example, a basic ML model may be sufficient to generate the prediction. Accordingly, in this example, in response to a new instance of the request, training workflow unit 302 may retrain one or more basic ML models on data for the past hour to generate the prediction about the next hour. Similarly, training workflow unit 302 may retrain one or more statistical ML models, e.g., in response to daily/nightly instances of the same request.

In some examples, training workflow unit 302 may determine a subset of available ML models for training. In other words, training workflow unit 302 may be configured to train XML models, but training workflow unit 302 may determine a subset consisting of Y ML models, where Y is less than X Training workflow unit 302 may train each respective ML model in the subset of the available ML models for a request, but not train the remaining ML models that are not in the subset for the request. Training workflow unit 302 may determine the subset in one of a variety of ways. For example, training workflow unit 302 may apply a Hodrick-Prescott filter to choose one baseline ML model and one statistical ML model for training and/or fine-tuning.

Training workflow unit 302 may perform a model evaluation process and a model selection process. During the model evaluation process, training workflow unit 302 may train ML models and generate evaluation metrics for the ML models. During the model selection process, training workflow unit 302 may use the evaluation metrics for the ML models to determine a selected ML model. This disclosure provides example details regarding the model evaluation process and model selection process with respect to FIG. 4.

Furthermore, with respect to the example of FIG. 3, production workflow unit 304 handles production workflows. Production workflow unit 304 may generate a production workflow to generate a prediction using a selected ML model for a request. This disclosure provides example details regarding the production workflow with respect to FIG. 5. In some examples, production workflow unit 304 may implement a Kubernetes-based machine learning pipeline.

Additionally, in the example of FIG. 3, model monitoring unit 306 monitors the predictions produced by the selected ML models for requests. For example, model monitoring unit 306 may monitor drift in a selected ML model and may automatically trigger a training workflow that retrains the selected ML model using subsequently collected data. In other words, model monitoring unit 306 may initiate a fine-tuning process on the selected ML model. Thus, after the selected ML model generates a prediction, model monitoring unit 306 may continuously or repeatedly monitor the performance of the selected ML model.

Thus, in some examples, the predictions produced by a selected ML model may include a prediction regarding the network traffic flows in network 205. Furthermore, in such examples, model monitoring unit 306 may generate ground-truth data regarding the network traffic flows in network 205. The ground-truth data correspond to the actual values that are being predicted in the prediction. Model monitoring unit 306 may generate the ground-truth data based on data (e.g., flow data) stored in data store 259. Additionally, model monitoring unit 306 may determine, based on comparisons of the predictions and the ground-truth data, whether to retrain the selected ML model. Based on the determination to retrain the selected ML model, model monitoring unit 306 may automatically retrain the selected ML model. Retraining the workflow may include using additional training data to update the selected ML model. For instance, in an example where the selected ML model is a deep learning ML model, training workflow unit 302 may generate new input-expected output pairs from new data stored in data store 259 and use the new input-expected output pairs to further train the deep learning ML model.

In some examples, to determine whether to retrain the selected ML model, model monitoring unit 306 may determine an error value based on a comparison of a specific prediction and the ground-truth data corresponding to the specific prediction. In some examples, the error value indicates a sum of differences between values in the ground-truth data and corresponding values in the prediction. Model monitoring unit 306 may make the determination to retrain the selected ML model based on the error value crossing a threshold of a confidence interval.

Figure 4:
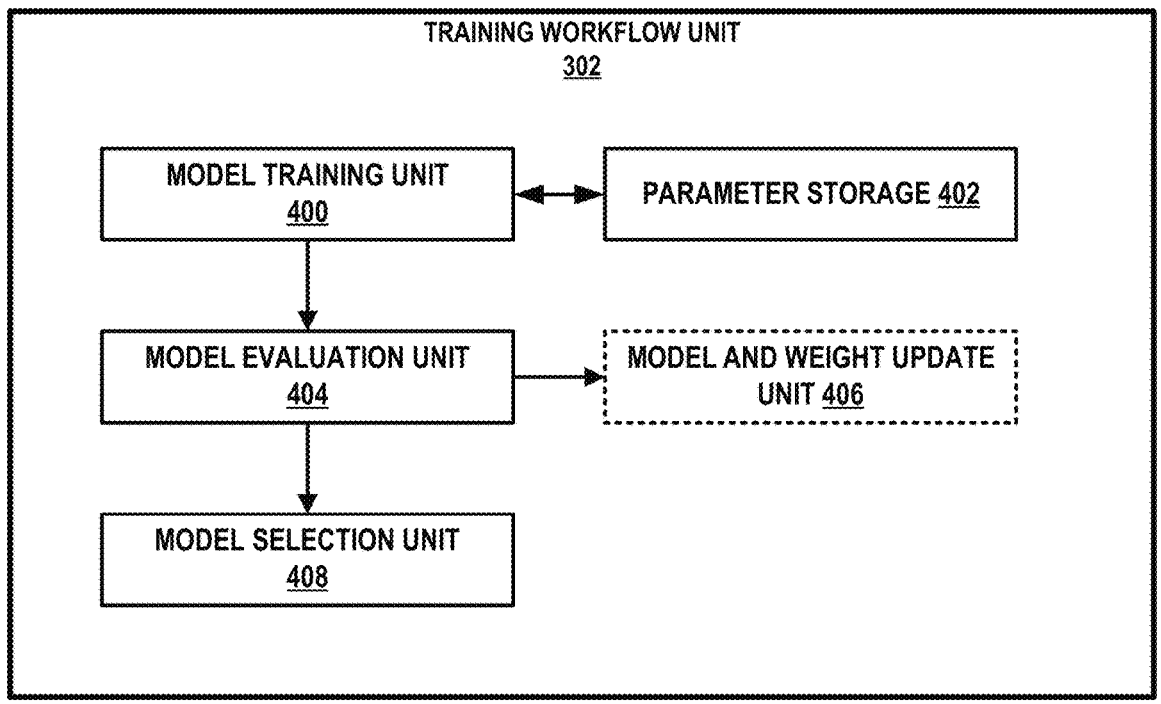
FIG. 4 is a conceptual diagram illustrating an example training workflow in accordance with one or more aspects of the present disclosure.

FIG. 4 is a conceptual diagram illustrating an example training workflow unit 302 in accordance with one or more aspects of the present disclosure. In the example of FIG. 4, training workflow unit 302 includes a model training unit 400, parameter storage 402, model evaluation unit 404, a model and weight update unit 406, and a model selection unit 408. In other examples, training workflow unit 302 may include more, fewer, or different units.

Model training unit 400 may perform processes to train ML models. More specifically, model training unit 400 may train an ML model to generate a type of prediction requested by a request. Thus, in some examples, model training unit 400 may train each ML model in a predetermined plurality of ML models to generate, based on data stored in data store 259, a respective training-phase prediction in a plurality of training-phase predictions.

As part of training ML models, model training unit 400 may retrieve parameters for the ML models from parameter storage 402. Additionally, model training unit 400 may update the parameters for the ML models as part of the training process. Model training unit 400 may store the updated parameters for the ML models back to parameter storage 402. Example types of parameters for an ML model may include weights and bias values for neurons of a deep learning ML model. Example types of parameters for a support vector machine (SVM) model may include data that characterize one or more hyperplanes that separate one or more classes. Example types of parameters for a regression-based ML model may include coefficients that characterize a regression function.

In some examples, model training unit 400 may update hyperparameters of certain types of ML models. For instance, in an example where model training unit 400 is training a deep learning ML model, model training unit 400 may update hyperparameters such as a learning rate, mini-batch size, topology parameters, and so on. In an example where model training unit 400 is training an SVM model, model training unit 400 may update a regularization constant and a kernel hyperparameter. When training statistical ML models, model training unit 400 may use a grid search or other techniques for updating the hyperparameters. When training deep learning ML models, model training unit 400 may perform cross-validation in stages. In a first stage, model training unit 400 may train a deep learning ML model for a small number of epochs to determine approximate values of workable hyperparameters. In a second stage, model training unit 400 may train the deep learning ML model for a longer period of time to fine tune the hyperparameters.

In some examples, ML system 138 may be configured to apply a plurality of ML models, but model training unit 400 may select a subset of the ML models from the plurality ML models (e.g., based on a Hodrick-Prescott filter, as described elsewhere in this disclosure). In some examples, the plurality of ML models may include ML models that have previously been previously trained and/or fine-tuned.

Model training unit 400 may train different types of ML models in different ways. For instance, in one example, where model training unit 400 is training a deep learning ML model, a request may include a query and input data criteria. The query may describe the prediction for the request. The input data criteria may specify what data (e.g., flow data) to use to generate the prediction. Furthermore, in this example, model training unit 400 may generate a plurality of input-expected output pairs. Each of the input-expected output pairs includes an input dataset and an expected output dataset. The input dataset may include data stored in data store 259 and meets the input data criteria. The expected output dataset includes data responsive to the query. In other words, model training unit 400 may run the query on data for past time periods to generate the expected output datasets. In this example, model training unit 400 may train one or more ML models based on the input-expected output pairs. For example, model training unit 400 may train the one or more ML models based on the input-output pairs using a supervised learning process. In this way, model training unit 400 may be able to train the one or more ML models without explicitly receiving input-expected output datasets from a user that seeks the prediction. This may help automate the process of obtaining predictions.

In the example of FIG. 4, model training unit 400 may use model evaluation unit 404 as part of the process to train an ML model. Model evaluation unit 404 may be responsible for actually using an ML model to generate a prediction. For instance, in an example where the ML model is a deep learning ML model, model evaluation unit 404 may perform a forward pass on the deep learning ML model to generate output data (e.g., a training-phase prediction). In this example, model evaluation unit 404 may compare the output data to expected output data (e.g., using an error function) to generate error values. Model evaluation unit 404 may perform a backpropagation process using the error values. The backpropagation process may update weights of the deep learning ML model. Model and weight update unit 406 may store the updated weights back to parameter storage 402.

In some examples, model evaluation unit 404 may determine confidence intervals for the predictions generated by one or more of the evaluated ML models. For instance, in some examples, model evaluation unit 404 applies the ML models to a validation dataset that includes validation input data associated with expected prediction. For each ML model, model evaluation unit 404 may calculate a standard deviation of the predictions generated by the ML model for the validation dataset. Model evaluation unit 404 may then use the standard deviation to determine the confidence intervals for the ML model. In some examples, confidence intervals may be used for selection of an ML model.

In some examples, model training unit 400 may generate augmented data and use the augmented data as validation data when training specific types of ML models. Model training unit 400 may use one or more generative adversarial networks to generate the augmented data based on data stored in data store 259.

Model selection unit 408 may automatically determine a selected ML model in the predetermined plurality of ML models based on evaluation metrics for the ML models trained for a request. Model selection unit 408 may use various evaluation metrics for the ML models to determine the selected ML model. For example, for regression-based ML models, model selection unit 408 may use evaluation metrics such as Root Mean Square Error (RMSE) for an ML model, a Mean Square Error (MSE) for the ML model, a mean absolute error (MAE), an Akaike information criterion (AIC) of the respective ML model, an AICc, a Mallows Cp, a confidence interval regression, a Bayesian information criterion (BIC) of the respective ML model, or another type of data. For classification-based ML models (e.g., statistical models, deep learning ML models, etc.), the evaluation metrics may include accuracy, specificity, recall, F1-Score (receiver operating characteristics (ROC)/area under curve (AUC), and so on. For ML models trained using unsupervised learning, model selection unit 408 may use a Silhouette score as an evaluation metric. In some examples, model selection unit 408 may compare the evaluation metrics for the ML models and select the ML model with the lowest (or highest) evaluation metric. In some examples, model selection unit 408 uses multiple evaluation metrics to determine the selected ML model. For example, model selection unit 408 may use a weighted metrics evaluation approach to determine the selected ML model. The metrics may be weighted to give or more less emphasis to specific metrics. In this example, for each of the ML models, model selection unit 408 may determine a sum of the weighted evaluation metrics for the ML model and select the ML model that with the lowest (or highest) sum. After model selection unit 408 determines the selected ML model, model selection unit 408 may store parameters (e.g., weights, bias values, coefficients, etc.) for the selected ML model in parameter storage 402 for later use. In some examples, the plurality of ML model from which model selection unit 408 selects an ML model may include one or more previously trained ML models for the request.

Figure 5:
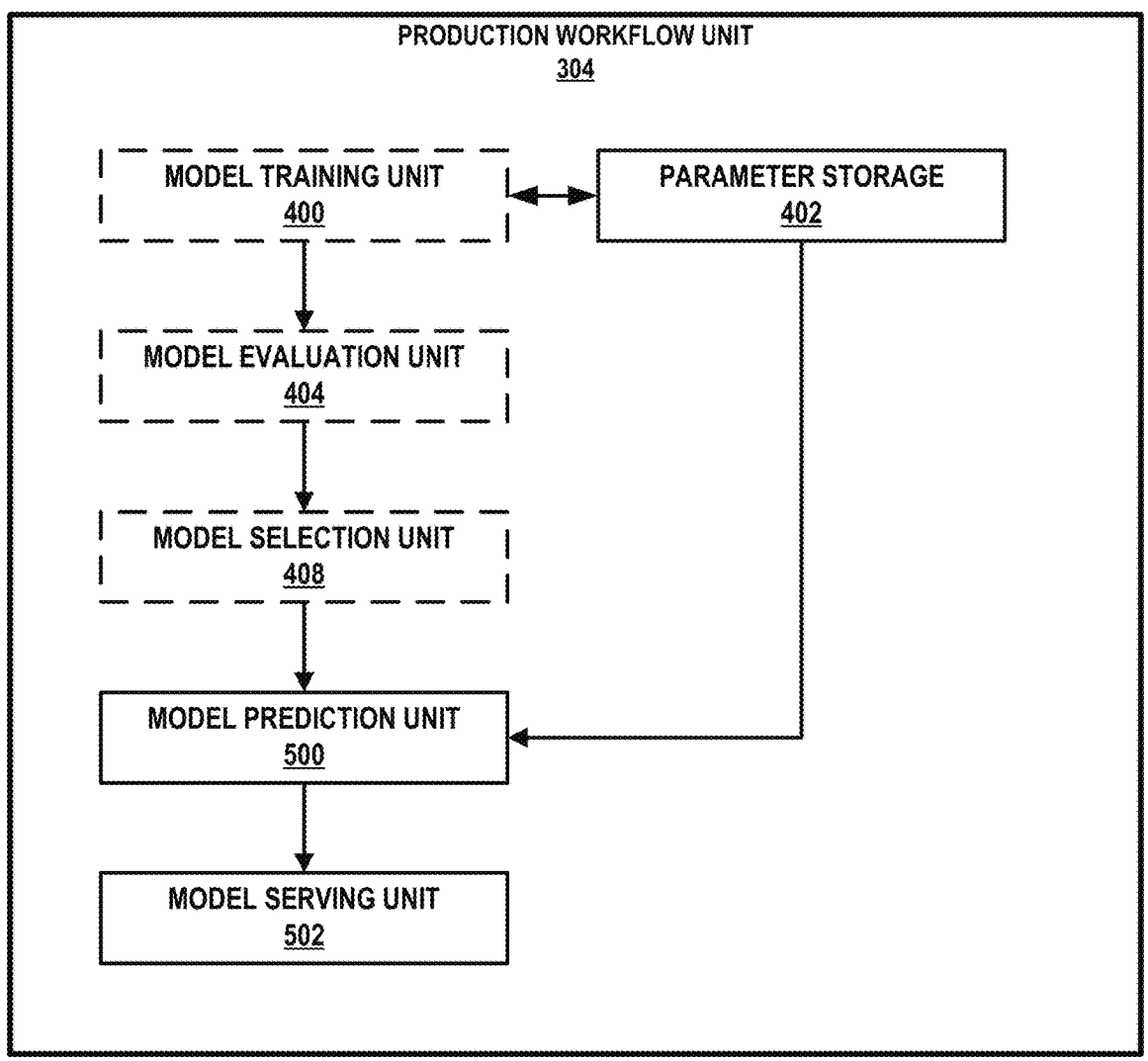
FIG. 5 is a conceptual diagram illustrating an example production workflow in accordance with one or more aspects of the present disclosure.

FIG. 5 is a conceptual diagram illustrating an example production workflow unit 304 in accordance with one or more aspects of the present disclosure. In the example of FIG. 5, production workflow unit 304 includes model training unit 400, parameter storage 402, model evaluation unit 404, model selection unit 408, a model prediction unit 500, and a model serving unit 502.

Model prediction unit 500 may obtain an indication of a selected ML model for a request from model selection unit 408. Additionally, model prediction unit 500 may obtain parameters for the selected ML unit from parameter storage 402. Model prediction unit 500 may apply the selected ML model to generate (e.g., based on data in data store 259) the prediction for the request. In some examples, the request itself may specify which data in data store 259 to use as input to the ML models for training and/or generating production workflow predictions. For instance, the request may specify a query for the data to use as input. In some examples, special purpose training data may be provided to ML system 138 for training ML models to generate predictions based on a request. A flag may be used to indicate to ML system 138 whether special purpose training data is provided or the request itself specifies data in data store 259 to use as input for training ML models and/or generating production workflow predictions.

Model serving unit 502 may further process the prediction generated by applying the selected ML model. For instance, model serving unit 502 may process the prediction to provide confidence intervals along with the prediction.

In some examples, production workflow unit 304 uses model training unit 400, model evaluation unit 404, model selection unit 408, and model serving unit 502 each time ML system 138 receives specific requests. In some such examples, the option to train, evaluate, and select ML models as part of a production workflow for a request (and thereby training, evaluating, and selecting ML models each time ML system 138 receives the request) may be specified by a user or program that generated the request. Training, evaluating, and selecting ML models as part of a production workflow may be particularly useful in situations in which the selected ML model changes as more input data becomes available over time or the information within the input data tends to change in a way that makes selection of different ML models advantageous.

In other examples, production workflow unit 304 does not use model training unit 400, model evaluation unit 404 and model selection unit 408 each time ML system 138 receives a specific request. For example, if the same selected ML model is useful multiple times for a request (e.g., on the same type of input data but with different time ranges), production workflow unit 304 does not use model training unit 400, model evaluation unit 404, or model selection unit 408 each time ML system 138 receives an instance of the request. Situations in which production workflow unit 304 does not train, evaluate, or select an ML model each time ML system 138 receives an instance of a request may be especially common when the selected ML model is a deep learning model.

Figure 6:
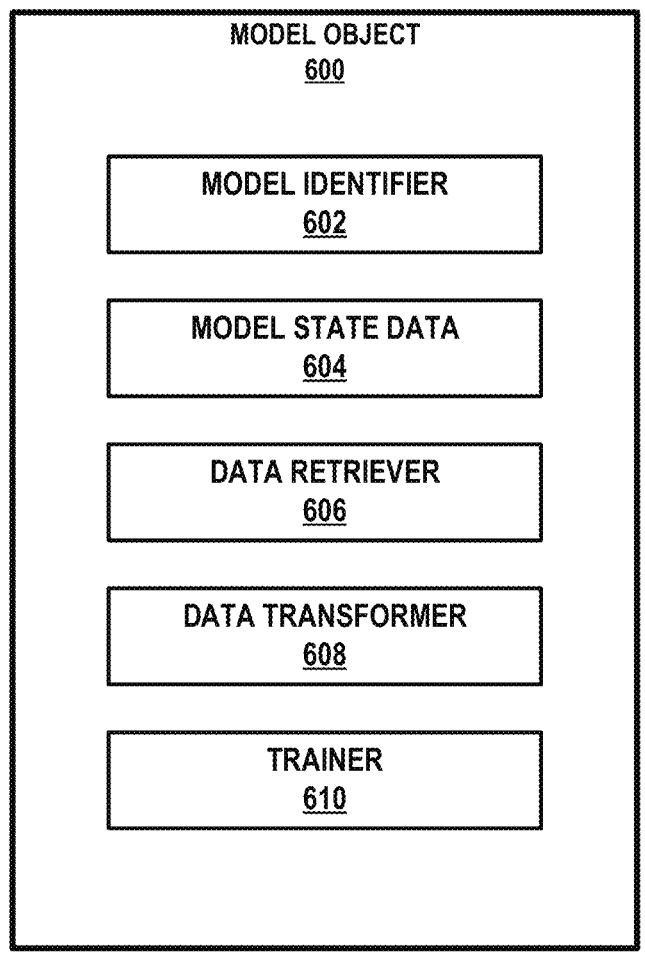
FIG. 6 is a conceptual diagram illustrating an example model object in accordance with one or more aspects of the present disclosure.

FIG. 6 is a conceptual diagram illustrating an example model object 600 in accordance with one or more aspects of the present disclosure. In some examples of this disclosure, ML system 138 may use model objects, such as model object 600, to manage ML models in ML workflows, such as training workflows and production workflows. Model object 600 may be an object-oriented programming software object. ML system 138 may use model object 600 for persistence, efficient storage, and retrieval of ML models.

In the example of FIG. 6, model object 600 includes a model identifier 602, model state data 604, a data retriever 606, a data transformer 608, and a trainer 610. Model identifier 602 identifies an ML model. For instance, model identifier 602 may be an identifier that globally identifies the ML model within ML system 138. In some examples, model identifier 602 may be used as a reference to identify model object 600 in internal and external API calls to an ML pipeline (e.g., a training workflow or a production workflow).

Model state data 604 may indicate whether the ML model is in a new state (e.g., untrained state), a trained state, an evaluated state, a deployed state, or an obsolete state. When the ML model is in the trained state, the ML model may be at least partially trained to generate the prediction for a request. When the ML model is in the evaluated state, the ML model may have been considered for selection, but was not selected. When the ML model is in the deployed state, the ML model may have been selected as the ML model for a request. When the ML model is in the obsolete state, the ML model is no longer used by ML system 138 and ML system 138 will not consider the ML model for subsequent selection or use as a selected ML model. Model object 600 may be tied to a training workflow or a production workflow. A training workflow may transition model object 600 between the new, trained, evaluated, and deployed states. A production workflow may use the ML model associated with model object 600 when model state data 604 indicates that the ML model is in the deployed state.

ML system 138 may use data retriever 606 of model object 600 to retrieve input data, e.g., flow data, used by the ML model. In some examples, data retriever 606 is a software object comprising functions to retrieve the input data. For instance, as described below with respect to FIG. 7, data retriever 606 may be implemented as a component object. In some examples, data retriever 606 specifies a query for retrieving the input data.

ML system 138 may use data transformer 608 to transform the input data prior to providing the input data to the ML model. For instance, data processing unit 300 (FIG. 3) of ML system 138 may use data retriever 606 to preprocess the input data. In some examples, data transformer 608 is a software object comprising functions to transform the input data. For instance, as described below with respect to FIG. 7, data transformer 608 may be implemented as a component object. In some examples, data transformer 608 specifies data indicating how to transform the input data.

ML system 138 may use trainer 610 of model object 600 to perform a training process for the ML model. For instance, trainer 610 may be or may indicate one or more programs, scripts, parameters, or other data for training the ML model.

Figure 7:
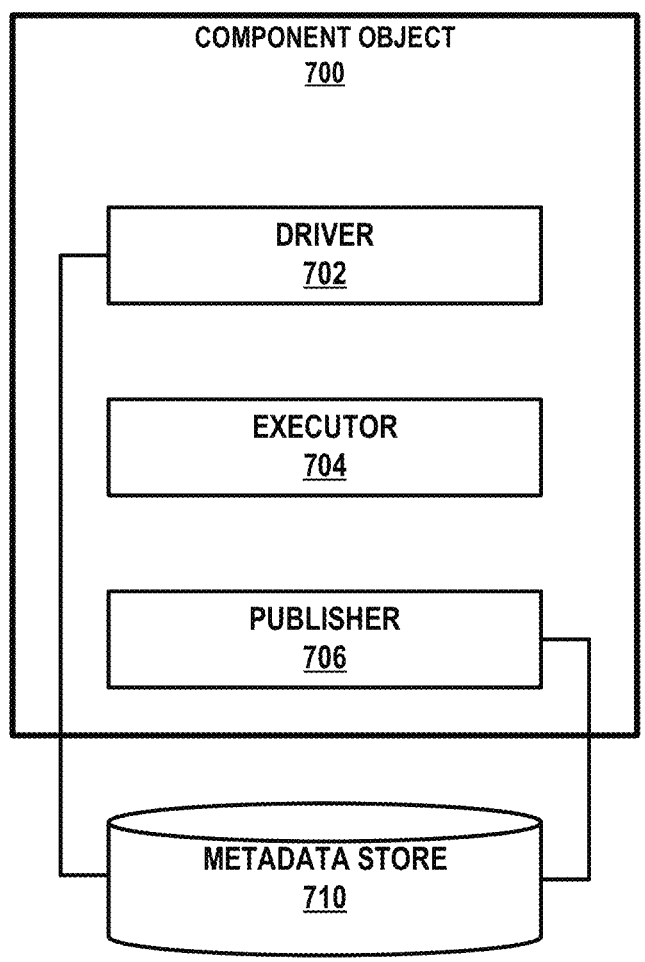
FIG. 7 is a conceptual diagram illustrating an example component object in accordance with one or more aspects of the present disclosure.

FIG. 7 is a conceptual diagram illustrating an example component object 700 in accordance with one or more aspects of the present disclosure. Component objects, such as component object 700, may be reusable, predefined, containerized operations/tasks that form basic units of workflows. In the example of FIG. 7, component object 700 includes a driver 702, an executor 704, and a publisher 706. Component object 700 may use a metadata store 708. In other examples, component objects may include more, fewer, or different units.

Driver 702 consumes input, such as metadata that drives the component. Such metadata may be stored in metadata store 710. Executor 704 may perform an action or task of the component. Publisher 706 writes artifacts generated by the component back to metadata store 710 for use by object operations. For example, when component object 700 is a data retriever (e.g., data retriever 606), driver 702 may obtain metadata that specify actions that executor 704 is to perform in order to retrieve input data for a ML object. In this example, publisher 706 may write back the input data retrieved by executor 704 to metadata store 710 (e.g., for use by ML system 138 in applying the ML model).

In an example where component object 700 is a data transformer (e.g., data transformer 608), driver 702 may obtain metadata that specify actions to perform to transform input data. Executor 704 may then apply the actions. In this example, publisher 706 may write the transformed input data back to metadata store 710 (e.g., for use by ML system 138 in applying the ML model).

Component objects may communicate with each other through metadata store 710. Metadata store 710 may implement one or more APIs to record and retrieve metadata from a storage backend (e.g., data store 259, parameter storage 402, etc.). In some examples, the metadata includes artifacts generated through the components/steps of the workflows. Furthermore, in some examples, the metadata include information about the execution of these components/steps. In some examples, the metadata includes information about the pipeline and associated lineage information. For instance, ML system 138 may generate metadata regarding workflow runs on ML models. This includes, but is not limited to, specific identifiers for runs, component level artifacts generated during the run and relevant lineage information from past pipeline workflow runs on this model for better debuggability and logging. Metadata store 710 may also contain artifacts generated by component objects, such as component object 700. Artifacts may be abstract entities that have an ArtifactType registered on-the-fly with metadata store 710 through client APIs. ArtifactType dictates the properties of the instances of this type.

Figure 8:
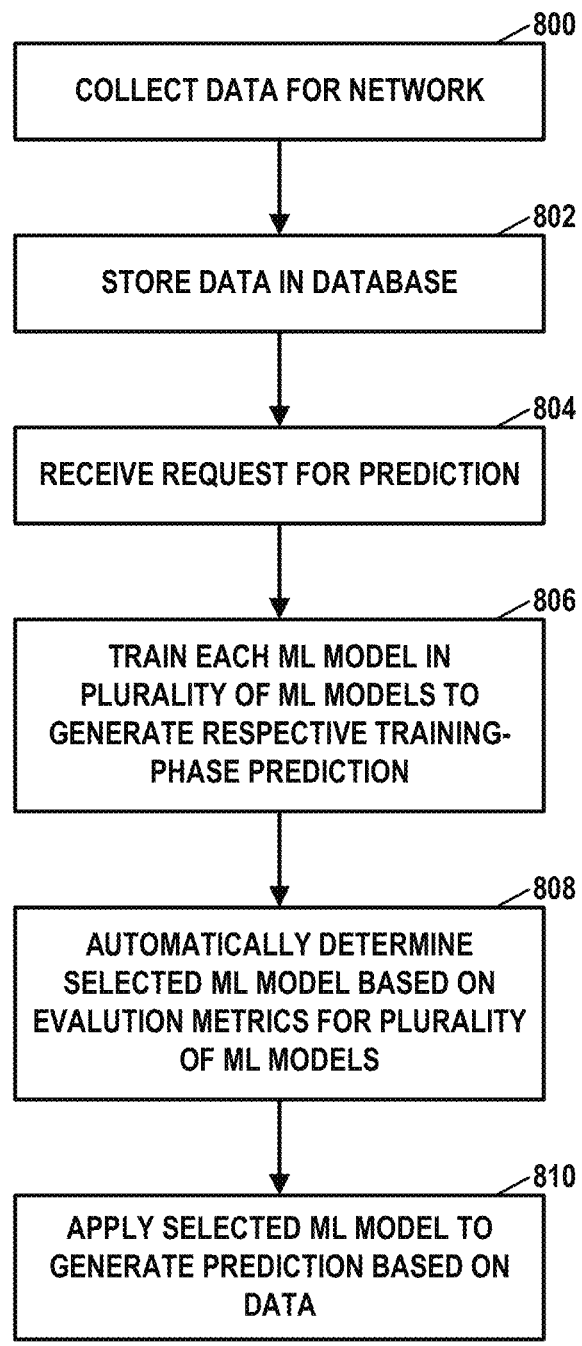
FIG. 8 is a flow diagram illustrating operations of a network analysis system in accordance with one or more aspects of the present disclosure.

FIG. 8 is a flow diagram illustrating operations of a policy controller 140 in accordance with one or more aspects of the present disclosure. In the example of FIG. 8, policy controller 140 (e.g., collector modules 252 of network analysis system) may collect data, such as flow data or other types of data, for network 205 (800). Network 205 includes a plurality of network devices (e.g., spine devices 202, leaf devices 203, host devices 210, etc.). Policy controller 140 may store the data in a database, such as data store 259 (802).

Furthermore, in the example of FIG. 8, policy controller 140 may receive a request for a prediction (804). For example, policy controller 140 may receive the request from user interface device 129 or another source.

Based on a request for a prediction that is received by policy controller 140, ML system 138 may train each respective ML model in a predetermined plurality of ML models to generate (e.g., based on the data collected from network 205 or provided training data), a respective training-phase prediction in a plurality of training-phase predictions (806). Examples of training ML models are provided elsewhere in this disclosure. In some examples, the predetermined plurality of ML models is a first plurality of ML models and ML system 138 may be configured to apply a second plurality of ML models that includes the first plurality of ML models and one or more additional ML models. However, rather than training each of the second plurality of ML models, ML system 138 may select the first plurality of ML models from the second plurality of ML models. For instance, ML system 138 may use the Hodrick-Prescott filter to determine whether the input data has a predominantly cyclical nature or trend nature, and select ML models from the second plurality of ML models that are appropriate for the cyclical or trend nature of the input data.

Furthermore, ML system 138 may automatically determine a selected ML model in the predetermined plurality of ML models based on evaluation metrics for the predetermined plurality of ML models (808). In some examples, as part of selecting the ML model, ML system 138 may, for each respective ML model in the predetermined plurality of ML models, determine a respective set of one or more evaluation metrics for the respective ML model based on the prediction generated by the respective ML model. Additionally, ML system 138 may determine a score for the respective ML model based on the set of one or more evaluation metrics for the respective ML model. For instance, to determine the score for the respective ML model, ML system 138 may, for each respective ML model of the predetermined plurality of ML models, determine the score for the respective ML model as a weighted average of the evaluation metrics for the respective ML model. ML system 138 may compare the scores for the ML models to determine the selected prediction. In some examples, ML system 138 may normalize evaluation metrics so that the evaluation metrics are in a common scale e.g., from (0 to 10, 0 to 100, etc.). In some examples, the evaluation metrics for the respective ML model include one or more of: a root-mean-square error of the respective ML model, a mean-square error of the respective ML model, a mean absolute error of the respective ML model, an Akaike information criterion (AIC) of the respective ML model, or a Bayesian information criterion (BIC) of the respective ML model. Certain types of evaluation metrics may be better suited for selecting specific types of ML models. For instance, root-square error, AIC, and BIC may be well suited for selecting among regression-based ML models.

ML system 138 may apply the selected ML model to generate the prediction based on data collected from network 205 (810). For instance, in an example where the selected ML model is a deep learning ML model, ML system 138 may perform a forward pass through the deep learning ML model to generate the prediction. ML system 138 or policy controller 140 may perform various actions with respect to the prediction. For instance, in some examples, ML system 138 or policy controller 140 may determine, based on the prediction, whether to generate an alert. In this example, ML system 138 or policy controller 140 may generate the alert based on a determination to generate the alert.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., user interface devices 129, spine devices 202, leaf devices 203, host devices 210, policy controller 140, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific figures, such systems, devices, and/or components may be implemented in a number of different ways. For instance, one or more devices illustrated in the figures herein as separate devices may alternatively be implemented as a single device; one or more components illustrated as separate components may alternatively be implemented as a single component. Also, in some examples, one or more devices illustrated in the figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various figures herein may alternatively be implemented as part of another device or component not shown in such figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
based on a request for a prediction regarding amounts of data that will flow through a communication link, a device, or a virtual network at a specific time or during a specific time period:
training, by a computing system, each respective machine learning (ML) model in a predetermined plurality of ML models to generate a respective training-phase prediction in a plurality of training-phase predictions;
automatically determining, by the computing system, a selected ML model in the predetermined plurality of ML models based on evaluation metrics for the predetermined plurality of ML models; and
applying, by the computing system, the selected ML model to generate the prediction based on flow data collected from a network that includes a plurality of network devices, wherein the flow data includes at least one of underlay flow data or overlay flow data.

2. The method of claim 1, wherein automatically determining the selected ML model comprises:
for each respective ML model in the predetermined plurality of ML models:
determining a respective set of one or more evaluation metrics for the respective ML model based on the training-phase prediction generated by the respective ML model; and
determining a score for the respective ML model based on the respective set of one or more evaluation metrics for the respective ML model; and
comparing the scores for the ML models to determine the selected ML model.

3. The method of claim 2, wherein the evaluation metrics for the respective ML model include one or more of: a confidence interval of the respective ML model, a root-mean-square error of the respective ML model, a mean-square error of the respective ML model, a mean absolute error of the respective ML model, an Akaike information criterion (AIC) of the respective ML model, or a Bayesian information criterion (BIC) of the respective ML model.

4. The method of claim 2, wherein determining the score for the respective ML model comprises, for each respective ML model of the predetermined plurality of ML models, determining, by the computing system, the score for the respective ML model as a weighted average of the evaluation metrics for the respective ML model.

5. The method of claim 1, wherein:
the predetermined plurality of ML models is a first plurality of ML models,
the computing system is configured to apply a second plurality of ML models that includes the first plurality of ML models and one or more additional ML models, and
the method further comprises selecting, by the computing system, the first plurality of ML models from the second plurality of ML models.

6. The method of claim 1, wherein the method further comprises:
generating, by the computing system, ground-truth data regarding the network;
determining, by the computing system, based on comparisons of the prediction and the ground-truth data, whether to retrain the selected ML model; and
based on the determination to retrain the selected ML model, automatically retraining the selected ML model.

7. The method of claim 6, wherein:
the ground-truth data include ground-truth data corresponding to the prediction, and
determining whether to retrain the selected ML model comprises:
determining, by the computing system, an error value based on a comparison of the prediction and the ground-truth data corresponding to the prediction; and
making, by the computing system, the determination to retrain the selected ML model based on the error value crossing a threshold of a confidence interval.

8. The method of claim 1, wherein the method further comprises:
determining, by the computing system, based on the prediction, whether to generate an alert of anomalous network traffic; and
generating, by the computing system, the alert of anomalous network traffic based on a determination to generate the alert of anomalous network traffic.

9. The method of claim 1, wherein:
the request comprises a query and indicates input data criteria, and
training each of the ML models comprises:
obtaining, by the computing system, data responsive to the query based on data stored in a data store;
generating, by the computing system, a plurality of input-output pairs, wherein:
each of the input-output pairs includes an input dataset and an output dataset,
the input dataset includes data stored in the data store and meets the input data criteria,
the output dataset includes the data responsive to the query; and
training, by the computing system, the predetermined plurality of ML models based on the input-output pairs.

10. The method of claim 9, wherein the underlay flow data is first underlay flow data, the overlay flow data is first overlay flow data, and the data stored in the data store comprises second underlay flow data and second overlay flow data.

11. The method of claim 1, wherein the plurality of ML models includes two or more different ones of: a statistical ML model, a deep learning ML model, or a baseline ML model.

12. The method of claim 1, further comprising outputting, by the computing system, data sufficient to generate at least part of a user interface indicating the prediction.

13. A system comprising:
a data store configured to store flow data collected from a network that includes a plurality of network devices; and
processing circuitry configured to:
based on a request for a prediction regarding amounts of data that will flow through a communication link, a device, or a virtual network at a specific time or during a specific time period:
train each respective machine learning (ML) model in a predetermined plurality of ML models to generate a respective training-phase prediction in a plurality of training-phase predictions;
automatically determine a selected ML model in the predetermined plurality of ML models based on evaluation metrics for the predetermined plurality of ML models; and
apply the selected ML model to generate the prediction based on the flow data collected from the network, wherein the flow data includes at least one of underlay flow data or overlay flow data.

14. The system of claim 13, wherein the processing circuitry is configured to, as part of automatically determining the selected ML model:
for each respective ML model in the predetermined plurality of ML models:
determine a respective set of one or more evaluation metrics for the respective ML model based on the training-phase prediction generated by the respective ML model; and
determine a score for the respective ML model based on the set of one or more evaluation metrics for the respective ML model; and
compare the scores for the ML models to determine the selected ML model.

15. The system of claim 14, wherein the processing circuitry determines the score for the respective ML model as a weighted average of the evaluation metrics for the respective ML model.

16. The system of claim 13, wherein:
the predetermined plurality of ML models is a first plurality of ML models,
the processing circuitry is configured to apply a second plurality of ML models that includes the first plurality of ML models and one or more additional ML models, and
the processing circuitry is further configured to select the first plurality of ML models from the second plurality of ML models.

17. The system of claim 13, wherein the processing circuitry is further configured to:
generate ground-truth data regarding the network;
determine, based on comparisons of the prediction and the ground-truth data, whether to retrain the selected ML model; and
based on the determination to retrain the selected ML model, automatically retrain the selected ML model.

18. The system of claim 17, wherein:
the ground-truth data include ground-truth data corresponding to the prediction, and
the processing circuitry is configured to, as part of determining whether to retrain the selected ML model:

determine an error value based on a comparison of the prediction and the ground-truth data corresponding to the prediction; and make the determination to retrain the selected ML model based on the error value crossing a threshold of a confidence interval.

19. The system of claim 13, wherein:

the underlay flow data is first underlay flow data, the overlay flow data is first overlay flow data, and the data stored in the data store comprises second underlay flow data and second overlay flow data, the request comprises a query and indicating input data criteria, and the processing circuitry is configured to, as part of training each of the ML models:

obtains data responsive to the query based on the second underlay flow data and second overlay flow data stored in the data store;

generate a plurality of input-output pairs, wherein:

each of the input-output pairs includes an input dataset and an output dataset, the input dataset includes data stored in the data store and meets the input data criteria, the output dataset includes the data responsive to the query; and train the predetermined plurality of ML models based on the input-output pairs.

20. A non-transitory computer-readable storage medium comprising instructions that, when executed, configure processing circuitry of a computing system to:

based on a request for a prediction regarding amounts of data that will flow through a communication link, a device, or a virtual network at a specific time or during a specific time period:

train each respective machine learning (ML) model in a predetermined plurality of ML models to generate a respective training-phase prediction in a plurality of training-phase predictions;

automatically determine a selected ML model in the predetermined plurality of ML models based on evaluation metrics for the predetermined plurality of ML models; and apply the selected ML model to generate the prediction based on flow data collected from a network that includes a plurality of network devices, wherein the flow data includes at least one of underlay flow data or overlay flow data.

* * * * *